US012428113B2

(12) United States Patent
Rotolante et al.

(10) Patent No.: US 12,428,113 B2
(45) Date of Patent: Sep. 30, 2025

(54) MARINE NAVIGATION LIGHT WITH FLEXIBLE CIRCUIT

(71) Applicant: Lumitec, LLC, Delray Beach, FL (US)

(72) Inventors: Steven Marc Rotolante, Jupiter, FL (US); Britain Andrews Fisher, Boynton Beach, FL (US); Michael Albion Kestner, Boynton Beach, FL (US); Christopher Robert Fulmer, Jupiter, FL (US)

(73) Assignee: Lumitec, LLC, Delray Beach, FL (US)

( * ) Notice: Subject to any disclaimer, the term of this patent is extended or adjusted under 35 U.S.C. 154(b) by 0 days.

(21) Appl. No.: 18/813,258

(22) Filed: Aug. 23, 2024

(65) Prior Publication Data

US 2025/0065997 A1 Feb. 27, 2025

Related U.S. Application Data

(60) Provisional application No. 63/534,155, filed on Aug. 23, 2023.

(51) Int. Cl.

| | |
|---|---|
| ***B63B 45/02*** | (2006.01) |
| ***F21V 23/00*** | (2015.01) |
| ***F21W 107/20*** | (2018.01) |
| ***F21Y 107/30*** | (2016.01) |
| ***F21Y 107/70*** | (2016.01) |
| ***F21Y 115/10*** | (2016.01) |

(52) U.S. Cl.
CPC ............ *B63B 45/02* (2013.01); *F21V 23/005* (2013.01); *F21W 2107/20* (2018.01); *F21Y 2107/30* (2016.08); *F21Y 2107/70* (2016.08); *F21Y 2115/10* (2016.08)

(58) Field of Classification Search
CPC ... B63B 45/02; B63B 45/04; B63B 2045/005; F21Y 2107/70; F21W 2107/20
See application file for complete search history.

(56) References Cited

U.S. PATENT DOCUMENTS

| | | | | |
|---|---|---|---|---|
| 11,293,620 | B1 * | 4/2022 | Murray | F21S 43/14 |
| 2008/0247161 | A1 * | 10/2008 | Hulsey | B63B 45/04 362/227 |
| 2011/0235322 | A1 * | 9/2011 | Fields | F21V 7/0083 362/245 |
| 2014/0268771 | A1 * | 9/2014 | Heikman | F21V 29/506 362/249.02 |
| 2014/0369038 | A1 * | 12/2014 | Tischler | F21L 4/00 362/249.08 |
| 2016/0003459 | A1 * | 1/2016 | Sweegers | F21V 29/58 362/249.08 |
| 2018/0163952 | A1 * | 6/2018 | Gielen | F21K 9/232 |
| 2019/0086061 | A1 * | 3/2019 | Hunter | F21V 19/0015 |
| 2019/0212004 | A1 * | 7/2019 | Van Bommel | F21S 4/24 |
| 2019/0331302 | A1 * | 10/2019 | Cai | F21K 9/232 |
| 2020/0363020 | A1 * | 11/2020 | Wu | F21K 9/232 |
| 2022/0221144 | A1 * | 7/2022 | Van Bommel | F21V 29/77 |

FOREIGN PATENT DOCUMENTS

DE 102017105918 A1 * 9/2018

* cited by examiner

*Primary Examiner* — Alexander K Garlen
(74) *Attorney, Agent, or Firm* — Calfee, Halter & Griswold LLP

(57) ABSTRACT

An LED navigation light comprising a flexible electrical circuit with LEDs wrapped around a core, wherein at least one LED faces inward, and light output is shaped by the core's openings and/or portions of the flexible electrical circuit.

17 Claims, 27 Drawing Sheets

MARINE NAVIGATION LIGHT WITH FLEXIBLE CIRCUIT

CROSS-REFERENCE TO RELATED APPLICATIONS

This application claims priority to and the benefit of U.S. Provisional Patent Application No. 63/534,155, filed on Aug. 23, 2023, and entitled MARINE NAVIGATION LIGHT WITH FLEXIBLE PRINTED CIRCUIT, the disclosure of which is herein incorporated by reference in its entirety.

BACKGROUND

Marine navigation lighting standards, governed by entities such as the International Maritime Organization (IMO) and the US Coast Guard, are crucial for ensuring the safety of vessels at sea. These lights prevent collisions and enable correct determination of a ship's size, type, and orientation, particularly in low visibility conditions. Navigation lights must adhere to stringent requirements regarding angle, intensity, and color, all measured relative to a vessel's zero-degree or dead-ahead position, with specific tolerances to ensure clarity and avoid confusion about a vessel's heading.

For example, the port and starboard navigation lights are approximated as red and green, respectively, and cover plus and minus 112.5 degrees from dead ahead along the horizon, where the colors switch at 0 degrees dead ahead. A tolerance of plus 3 degrees is given to go from 100% intensity to approximately 0% intensity for both the port and starboard, such that their total overlap is 6 degrees maximum. Similarly, the light distribution of the stern light and masthead have their own required angle tolerances. The critical angles for determining the heading of a vessel are primarily along the horizon; however, minimum vertical intensity requirements must also be met.

Navigation light intensity is measured in nautical miles and is dictated based on the vessel's length. For example, a vessel below 12 meters in length may only require lights that emit enough luminous intensity to be visible at a minimum of 2 nautical miles. Governing standards set the minimum candela various light sources must meet to be visible at 2 nautical miles. In one example, this is 5.4 candela. Three (3) nautical miles is the minimum required intensity of vessels between 12 meters and 50 meters in length per US Coast guard and international regulations.

The chromaticity of each light is also governed by a boundary created with x, y coordinates on the color space chart.

Prior LED navigation lights are often designed based on older incandescent fixtures where LEDs are lensed or combined to replicate the incandescent bulb. In other cases, a sufficiently large LED emits the required intensity, thus increasing the source size. As the source size increases, the radius at which the baffles must be located to the source must also increase to achieve the required angle cutoff tolerances.

Further complications arise in the construction of navigation lights intended for different vessel lengths and visibility ranges. Specific challenges include achieving acceptably consistent light intensity over regulated distances (e.g., 2 nautical miles for vessels under 12 meters).

What is needed is an improved marine navigation light technology that efficiently addresses these challenges.

FIELD

This technology pertains to the field of marine navigation lighting. Specifically, it addresses the issues using of flexible printed circuits wrapped around a core for LED-based marine navigation lights, enhancing illumination performance while reducing hardware size and complexity.

SUMMARY

In one aspect, the technology pertains to an LED navigation light that uses a flexible electrical circuit carrying LEDs wrapped around a core having openings therethrough. Some of the LEDs face inward toward the inside of the core, and the light output from these inward-facing LEDs is shaped by the walls of openings in the core and/or by portions of the flexible electrical circuit.

One object of the technology is to improve the distribution of light patterns necessary for marine navigation lights by arranging multiple LEDs on a flexible circuit to create specific light patterns including masthead lights and 360-degree all-around lights. Another object is to employ smaller LED sizes and innovative configurations to maintain required light intensity and angle specifications while reducing the physical size and thermal impact of the navigation light assembly.

In an embodiment, the LED navigation light utilizes a first plurality of LEDs to create a first light pattern, such as a masthead light pattern, and a second plurality of LEDs to create a second light pattern, such as a 360-degree all-around light pattern. Some LEDs may be inward-facing, while others may be outward-facing, depending on the specific light pattern requirements.

In yet another embodiment, the light patterns are separated in the axial direction along the core, allowing for different components of the light patterns to be stacked vertically and rotated axially. This vertical stacking and axial rotation help to distribute heat more effectively and creates distinct light patterns required for navigation lights.

In another embodiment, the flexible electric circuit may include integrated light sensors. These sensors measure components of the LED intensity to ensure it meets predefined levels and can trigger adjustments or alerts if the intensity falls below a threshold. This feature aids in maintaining compliance with navigation light standards and ensures ongoing functionality.

BRIEF DESCRIPTION OF THE DRAWINGS

The lighting devices herein may be better understood by reference to the following detailed description, taken in conjunction with the accompanying drawings, in which.

DETAILED DESCRIPTION

Figure 1:
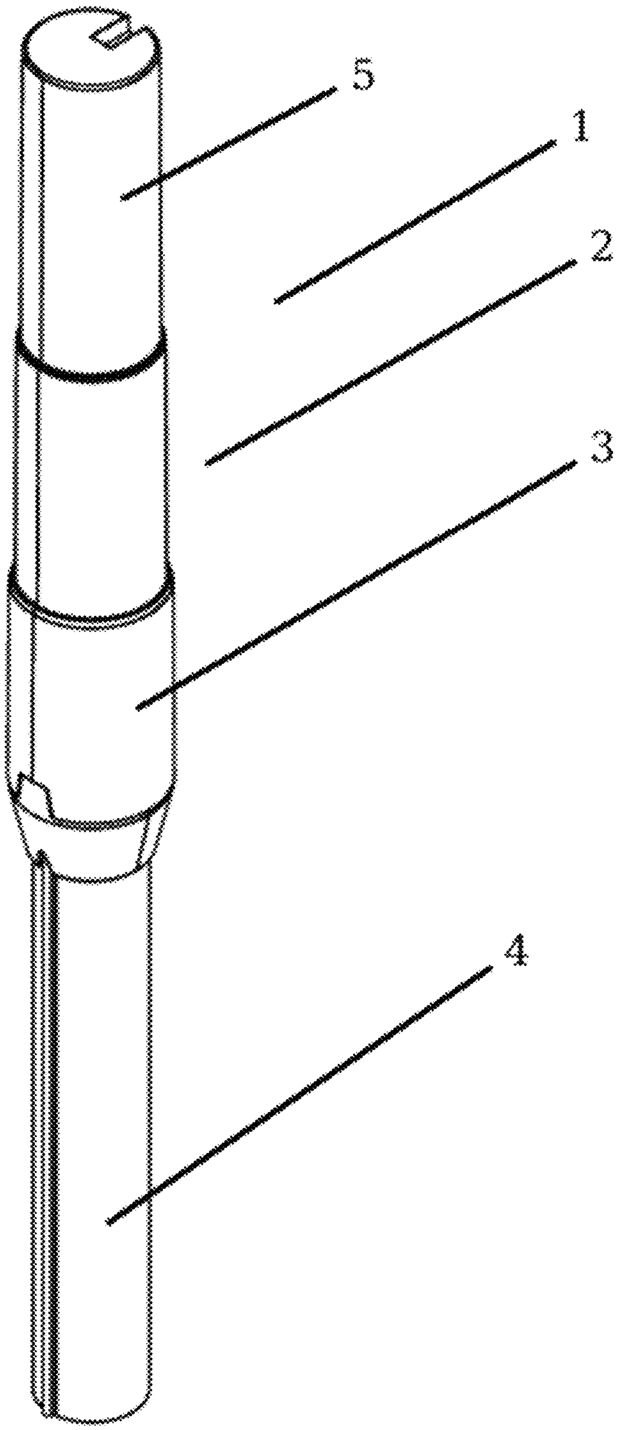
FIG. 1 shows a perspective view of an exemplary LED navigation light assembly, comprising a navigation light including an LED light and a window carried by a pole.

Reference will now be made in detail to exemplary embodiments, examples of which are illustrated in the accompanying drawings. It is to be understood that other embodiments may be utilized, and structural and functional changes may be made without departing from the respective scope of the claims. Moreover, features of the various embodiments may be combined or altered without departing from the scope of the claims. As such, the following description is presented by way of illustration only and should not limit in any way the various alternatives and modifications that may be made to the illustrated embodiments and still be within the spirit and scope of the claims.

The present navigation lights take advantage of the smaller source size of LEDs to benefit light cutoff angles. The exemplary navigation lights herein leverage the smaller source size of LEDs to reduce overall fixture size while meeting all regulatory requirements for angle cutoff, intensity, and chromaticity. This enhances both the practicality and performance of marine navigation lights, leading to safer and more effective navigation lighting systems for vessels of various sizes.

Some navigation lights can benefit from reducing the overall size of the light to aid in mounting and space requirements. For example, a pole-mounted masthead light could benefit from a smaller optic assembly to reduce the total mass on the end of a pole that could be approximately 1 meter in length in some cases. Exemplary navigation lights herein use a few techniques to make the reduction in diameter and mass possible. First, an LED with a small source size in the horizontal direction was chosen to minimize the radius of the baffle. The cutoff angles are a direct function the how quickly the baffle blocks the horizontal distance of the LED source. For example, an LED with a horizontal distance of 1 mm across the emission area requires approximately a 13 mm radius to achieve the masthead cutoff requirements. In some prior art, the full emission angle of 225 degrees for the masthead light requires a minimum diameter of 26 mm and larger in other cases due to the larger source size. In the navigation lights herein, overall diameter is reduced by over half by creating a particular optical structure and LED combination and stacking each portion of the light emission angle to build the complete and required light projection angle. Some LEDs have a less than 360-degree emission angle, so multiple LEDs, diffusion, or lensing would be required to achieve 360 degrees of emission or some portion of 360 degrees. In the navigation lights herein, a flexible circuit is used to wrap LEDs around an optical core where the light projection angle from an LED is generally pointed toward the center of curvature. LEDs are arranged in such a way as to minimize the thermal impact of LEDs in proximity to each other. LED optic sections are stacked to multiply the output when intensity or angle requirements are not met from a single emitter, while maintaining the required cutoff angles.

This technology can be used to meet the intensity and angle requirements of a port light, a starboard light, a 225-degree masthead light, a 360 all-around anchor light, and/or a stern light.

In some exemplary embodiments, the LEDs, the flexible printed circuit board, and the core cooperate to form a 225-degree masthead light. In some exemplary embodiments, the LEDs, the flexible printed circuit board, and the core cooperate to form a 360 all-around light. In some exemplary embodiments, the LEDs, the flexible printed circuit board, and the core cooperate to form a 225-degree masthead light and at least one other light. In some exemplary embodiments, the LEDs, the flexible printed circuit board, and the core cooperate to form a 360 all-around light and at least one other light. In some exemplary embodiments, the LEDs, the flexible printed circuit board, and the core cooperate to form both a 225-degree masthead light and a 360 all-around light. In some exemplary embodiments, the LEDs, the flexible printed circuit board, and the core cooperate to form both a 225-degree masthead light and a 360 all-around light. In some exemplary embodiments, the LEDs, the flexible printed circuit board, and the core cooperate to form a 225-degree masthead light, a 360 all-around light, and a 135-degree stern light.

In some exemplary embodiments, the flexible printed circuit board blocks and/or the core blocks light from the emitters to create an output pattern that meets angle requirements for a particular navigation light as well as block specular reflections within the window that add unwanted noise into an emitted light pattern.

In some exemplary embodiments, the axial distance between emitters (stacked distance) helps distribute heat.

In some exemplary embodiments, the tapered window and optic create an assembly where copper flex (e.g., the flexible circuit) can contact the outer window to dissipate heat to the ambient environment.

In some exemplary embodiments, the LEDs face both inward, toward the center of curvature of the core and/or the flexible circuit, or face away from the center of curvature, or a combination of both, i.e., some LEDs facing toward the core and some facing outward, away from the core.

Exemplary embodiments include, e.g.:

A. A 360 all-around light and a 225-degree masthead light—In some exemplary embodiments the LEDs forming the 360 all-around light face outward and at least some of the LEDs forming the 225-degree masthead light face inward. In some exemplary embodiments the LEDs forming the 360 all-around light face outward, some of the LEDs forming the 225-degree masthead light face inward, and the rest of the LEDs forming the 225-degree masthead light face outward. In some exemplary embodiments a subset of the plurality LEDs forming the 360 all-around light also are part of the subset of LEDs forming the 225-degree masthead light.

B. A 360 all-around light, a 225-degree masthead light, and a 135-degree stern light—In some exemplary embodiments the LEDs forming the 360 all-around light face outward, at least some of the LEDs forming the 225-degree masthead light face inward, and the LEDs forming the 135-degree stern light face inward. In some exemplary embodiments all of the LEDs forming the 360 all-around light face outward, some of the LEDs forming the 225-degree masthead light face inward, the rest of the LEDs forming the 225-degree masthead light face outward, and all the LEDs forming the 135-degree stern light face inward. In some exemplary embodiments a subset of the plurality LEDs forming the 360 all-around light also are part of the subset of LEDs forming the 225-degree masthead light.

In exemplary embodiments, the LEDs that make the 360 all-around light are equally spaced. In some exemplary embodiments, there are eight (8) LEDs that make the 360 all-around light and they are equally spaced at 45 degrees.

In exemplary embodiments, the LEDs that make up the 225-degree masthead light are not equally spaced. In some exemplary embodiments, the (6) LEDs that make up the 225-degree masthead light are not equally spaced. In some exemplary embodiments, the end emitters are targeted to create sharp cutoffs more than uniform illumination. In some exemplary embodiments, the LEDs towards the outside are slightly different spacings from the other similar led because of the taper on the core.

In some exemplary embodiments, all of the LEDs are vertically mounted (i.e., mounted so that the tall side of their rectangular shape is vertical) (or mounted nearly vertically because of the taper of the core) to allow for tighter cutoff angles and flex diameters. In some exemplary embodiments, the 360 all-around angles are 45 degrees. The center emitters on the masthead are 45 degrees from each other but the outer LEDs are roughly 86 degrees from their adjacent emitter.

In some exemplary embodiments, the core acts as a shade or mask for the light pattern, which helps achieve sharp cutoffs. In some exemplary embodiments, the flexible circuit is also used for a shade or mask for the light pattern.

In some exemplary embodiments, the core has a substantially cylindrical or frustoconical outer surface, e.g., substantially cylindrical or frustoconical with sections removed from the substantially cylindrical or frustoconical piece. "Substantially cylindrical" as used herein means cylindrical or slightly frustoconical, e.g., less than a 2-degree taper, e.g., having a 0.3-1 degree taper. In some exemplary embodiments, the outer optical piece has a matching substantially cylindrical or frustoconical outer surface (taking into account the thickness, if needed, of the flexible circuit carrying the LEDs) so heat from the LEDs conducts from the LEDs to the flexible circuit to the outer optical piece. Heat from the LEDs conducts from the LEDs to the flexible circuit to the core as well.

Some exemplary embodiments, have one or more light sensors in the design, e.g., one or more photodetector soldered to the flexible circuit like the LEDs to measure light levels. In this case, a microcontroller receives the signal and gives some indication to the user over a data line or blinking light to indicate that the light is out of regulated light levels. In some exemplary embodiments, there is a sensing or hour/time meter to determine when the life of the product has been exceeded.

In some exemplary embodiments, some of the LEDs are on the inside of the flexible circuit and some are on the outside of the flexible circuit. In some exemplary embodiments, some of the LEDs are on the inside of the flexible circuit and into openings in the core to shine light through the core to exit the other side of the core. In some exemplary embodiments, some of the LEDs are on the inside of the flexible circuit and some are on the outside of the flexible circuit. In some exemplary embodiments, some of the LEDs are on the inside of the flexible circuit and into openings in the core to shine light through the core to exit the other side of the core and some are on the outside of the flexible circuit. In some exemplary embodiments, the 360-degree LEDs are on the outside of the flexible circuit. In some exemplary embodiments, some of the masthead LEDs are on the inside of the flexible circuit and into openings in the core to shine light through the core to exit the other side of the core and some are on the outside of the flexible circuit.

In some exemplary embodiments, some of the LEDs are on the inside of the flexible circuit. In some exemplary embodiments, some of the LEDs are on the inside of the flexible circuit and into openings in the core to shine light through the core to exit the other side of the core. In some exemplary embodiments, all of the LEDs are on the inside of the flexible circuit. In some exemplary embodiments, all of the LEDs are on the inside of the flexible circuit and into openings in the core to shine light through the core to exit the other side of the core. In some exemplary embodiments, the 360-degree LEDs are on the inside of the flexible circuit. In some exemplary embodiments, the masthead LEDs are on the inside of the flexible circuit and into openings in the core to shine light through the core to exit the other side of the core.

The exemplary navigation light shown in U.S. Provisional Pat. Ser. No. 63/534,155, filed Aug. 23, 2023 ("the '155 Appl'n"), which is incorporated herein by reference in its entirety, uses the teachings herein for a combination of a 360-degree (all-around) light and a 225-degree masthead light with a minimum of 3 nautical miles intensity (a 3 nm light must have over 15 candela).

Figure 2:
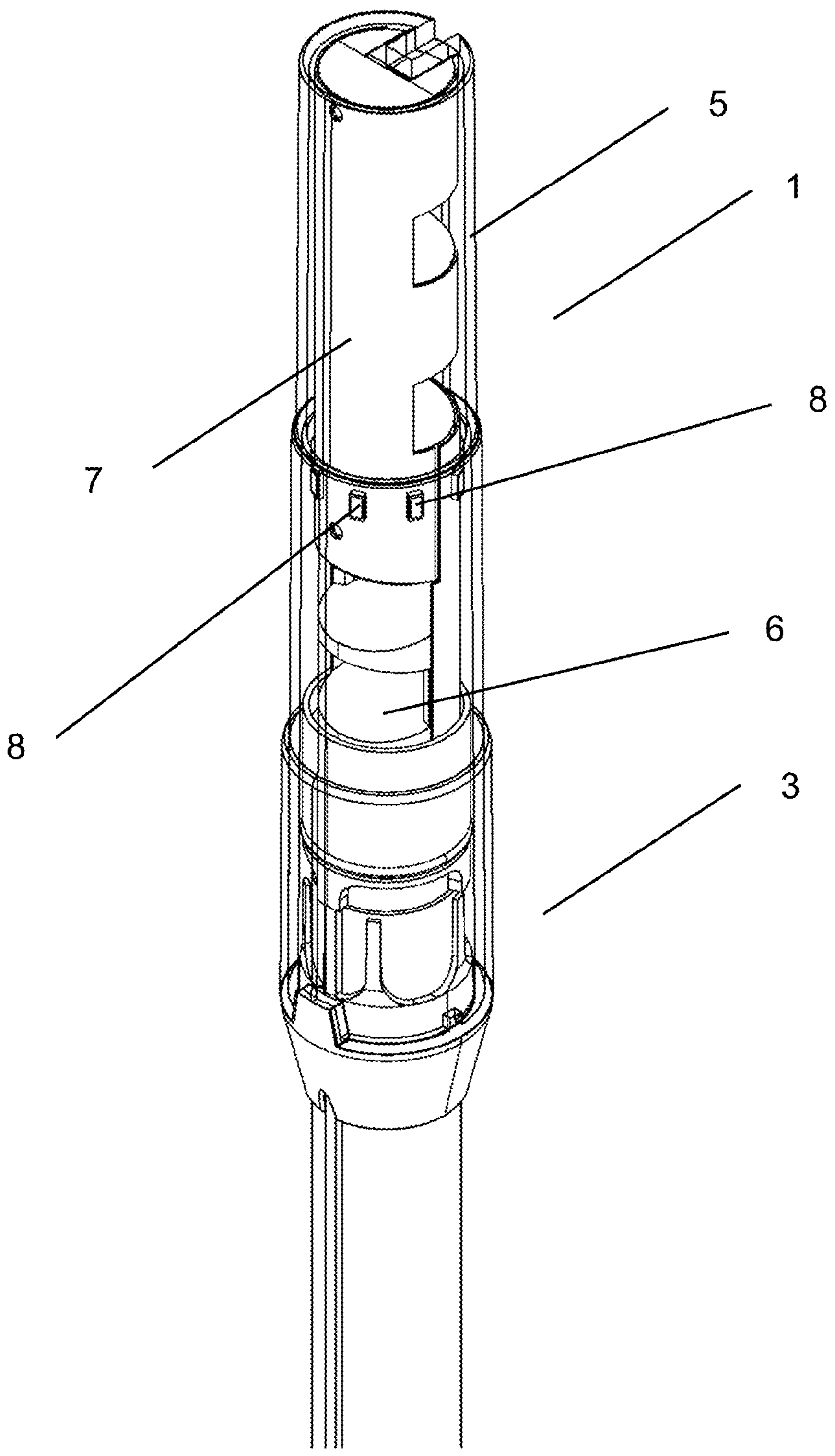
FIG. 2 is a rear/left/top perspective view of the exemplary LED navigation light assembly, showing the window in phantom, which exposes the core, flexible circuit, and LEDs of the LED light.
Figure 3:
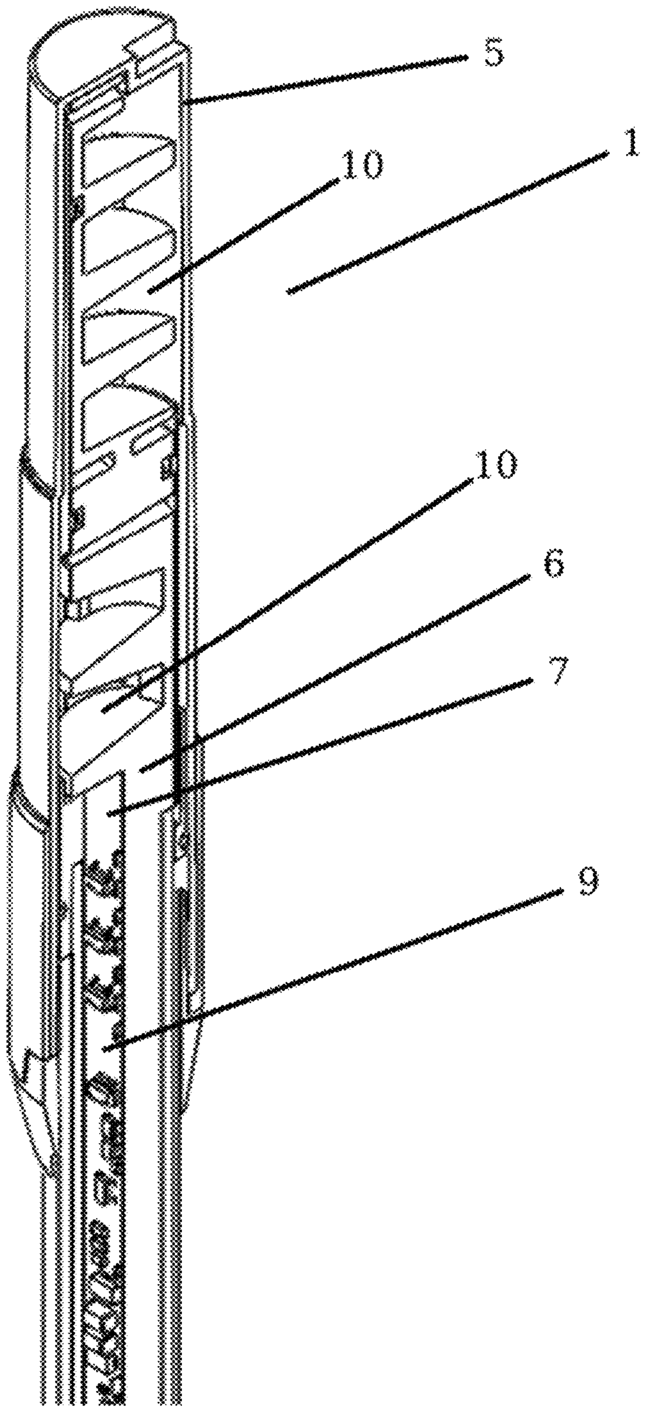
FIG. 3 is a cross-sectional perspective view of the navigation light, showing the window, the core, and the flexible circuit, which carries LED drivers.
Figure 4:
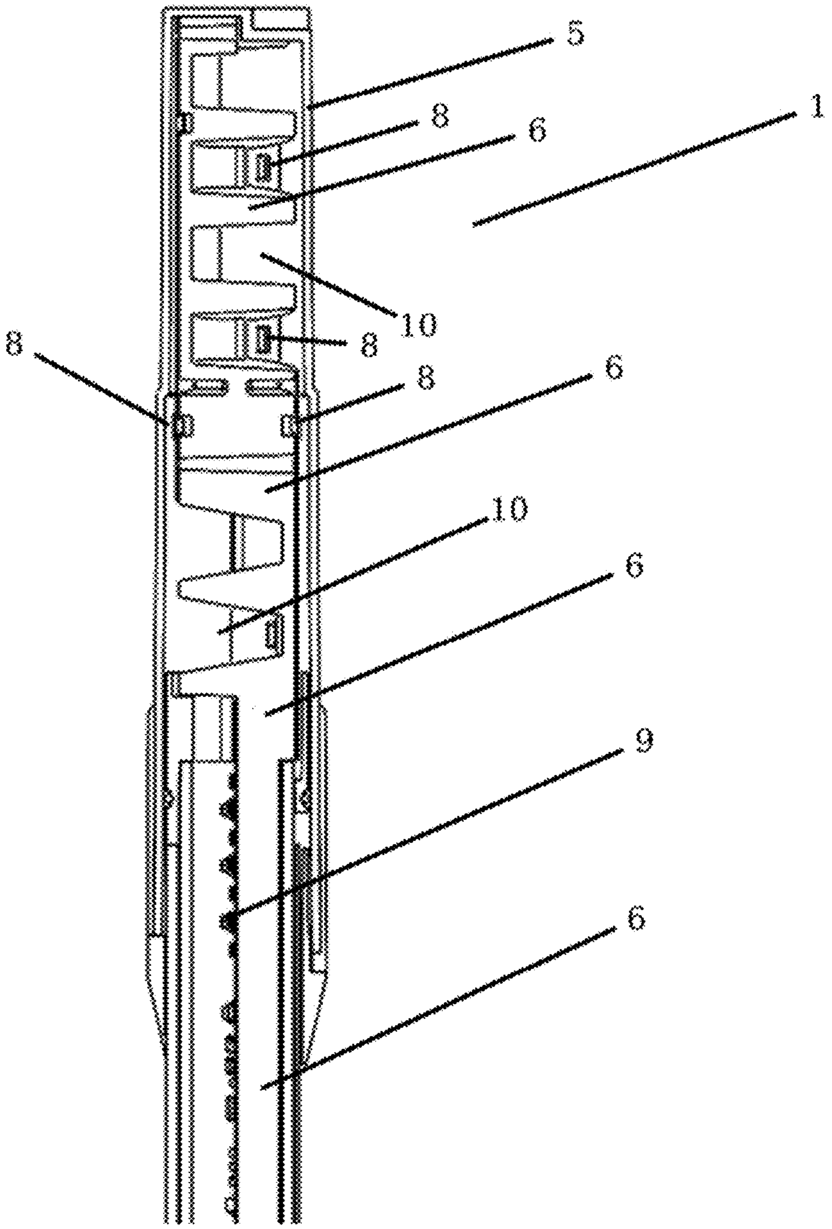
FIG. 4 is a cross-sectional view of an exemplary LED navigation light, illustrating the placement of the core, LEDs, driver circuit, flexible circuit, and core openings.

In FIG. 1 of the '155 Appl'n, a transparent window (1) protects the optic, LED board, and control circuitry from the environment and is attached to the pole (7), which is mounted near the center point of a vessel. The pole length is determined based on the location of the other vessel's navigation lights. FIG. 2 of the '155 Appl'n illustrates the optic (2) with optical surfaces and a flexible circuit board (3). The flexible circuit board, in this example, distributes power to 12 emitters and is wrapped around the optical core of the navigation light. The small rectangles on the flex circuit in FIG. 2 correspond to the locations of the LEDs on the opposite side of the flex circuit in this exemplary embodiment. FIG. 3 of the '155 Appl'n shows the flattened LED flex circuit board with LEDs and control circuitry (the side that would be facing the core). The emitters (4,5) shown in FIG. 3 are directed toward the center of the optical core when assembled and curved around the optic. In this example, the emitters labeled as 4 in FIG. 3 create the 360-degree all-around light, while the emitters labeled as 5 in FIG. 3 are powered to provide the light distribution angle of a masthead light. All emitters in this example are approximated as white and meet the chromaticity requirements for this navigation light. In this example, one set of two emitters is used for both the masthead and 360 all-around light. The area labeled as 6 in FIG. 3 is used for the electrical circuitry to power each set of emitters at a specific current from a given range of input voltages. In this example, the optic (2) and the window (1) are tapered to create an assembly where the flexible board (3) is in contact with both components. This helps locate the emitters in a particular location and conducts some thermal energy into the window and subsequently into the environment. FIG. 4 of the '155 Appl'n overlays the intensity curve for one LED and illustrates how the optic baffles the light to create the cutoff angle, theta. The summation of multiple emitters is used to create the cutoff and intensity to meet the specifications for masthead lights in FIG. 5 of the '155 Appl'n. For other navigation lights, such as the port light, the intensity cutoff specification could be similar to FIG. 6 of the '155 Appl'n. Minimum intensity values for various navigation light visibility requirements are shown in Table 1 of the '155 Appl'n. Measured angle over intensity data from a prototype masthead light is shown in FIG. 7 of the '155 Appl'n. The noise shown in the chart is due to the prototype window used to evaluate the performance of a navigation light. FIGS. A-L of the '155 Appl'n show various views of an exemplary embodiment, e.g., (a) core alone, (b) core and flexible circuit for the LEDs, or (c) core, flexible circuit for the LEDs, and outer optic.

In some exemplary embodiments, the outer optic does not include lenses (other than the natural lensing effect caused by a clear cylindrical or frustoconical shell of substantial uniform thickness). In other exemplary embodiments, the outer optic does include lenses (not shown).

Referring now to the figures of the present application, FIG. 1 shows an assembly for a marine navigation light system designed to provide regulatory-compliant lighting for vessels. The navigation light 1 having an LED light 2 is positioned at the top of the assembly, providing necessary visibility to other vessels. A cover 3 is included to protect the internal components of the LED light 2, such as the LEDs and drivers, from the marine environment. The LED light 2 is at the distal end of a pole 4 in exemplary embodiments. The cover 3 has a transparent window 5 that helps ensures that the light emitted remains clear and unobstructed by external elements like water spray, dust, or salt deposits.

The entire assembly is mounted on a pole 4, which provides a sturdy structure for the navigation lighting system. The pole 4 positions the navigation light 1 at a height optimal for visibility according to marine safety regulations, ensuring that it can be seen from all necessary angles around the vessel.

FIG. 2 shows the navigation light 1 with the window 5 in phantom, showing various internal components enclosed by the window 5. The cover 3, including the window 5, surrounds the inner assembly, providing external protection and structural support.

In this exemplary embodiment, the core 6 is centrally located within the navigation light 1. Wrapped around the core 6 is a flexible circuit 7, which is designed to distribute electrical power to LEDs, LED drivers, etc. The flexible circuit 7 is wrapped around the core 6 in a concentric manner, allowing for efficient use of space and effective thermal management. Positioned on the flexible circuit 7 are multiple LEDs 8, which are responsible for emitting the necessary light to meet marine navigation requirements. Two individual exemplary LEDs 8 are labeled, indicating their placements on the circuit.

A window 5 is situated near the upper portion of the navigation light 1, allowing the emitted light to pass through while protecting the internal electronic components from environmental factors such as water and debris.

The assembly utilizes specific design techniques to achieve the required photometric and chromaticity specifications, with the cooperation of flexible circuit 7, core 6, and LEDs 8 all contributing to the precise and effective performance of the navigation light. The spatial arrangement and thermal dissipation pathways are managed by the strategic placement and wrapping of the flexible circuit 7 around the core 6, enhancing durability and efficiency.

Together, these elements form a cohesive unit that ensures the functionality and durability of the marine navigation light system, important aspects for maintaining maritime safety standards.

FIG. 3 and FIG. 4 show cross-sectional views of the navigation light 1 showing the core 6 and core openings 10. Cover 3 with window 5 is depicted as the main outer structure designed to house and protect the internal elements. The cover 3 ensures that the navigation light 1 remains weatherproof and durable for maritime environments.

The design of the internal components includes a core 6, around which a flexible circuit 7 is wrapped. The core 6 serves as a structural and thermal management component, providing support and aiding in heat dissipation from the LEDs mounted on the flexible circuit 7.

The flexible circuit 7 is shown wrapped around the core 6, featuring multiple LED drivers 9. These LED drivers 9 are responsible for supplying regulated the power to drive the LEDs to cause them to illuminate, ensuring stable operation and adequate lighting performance. This flexible circuit 7 allows for a compact design by accommodating the necessary electronic components and connections while conforming to the shape of the outside of core 6.

In summary, FIGS. 3-4 comprehensively illustrate the layout and interaction of elements within the marine navigation light 1, including the core 6, flexible circuit 7, and LED drivers 9. This configuration ensures effective performance, durability, and compliance with maritime lighting standards.

FIGS. 5-9 show various views of the exemplary the navigation light 1 with the cover 3 and its window 5 removed. FIGS. 5-9 depict multiple views of embodiments related to a navigation light 1, which includes various components such as a core 6, LEDs 12, 13, 16, a flexible circuit 7, an O-ring 11, and core openings 14, 15. The description of each figure focuses on these elements, tying them into the functionality of the navigation light system.

Figure 5:
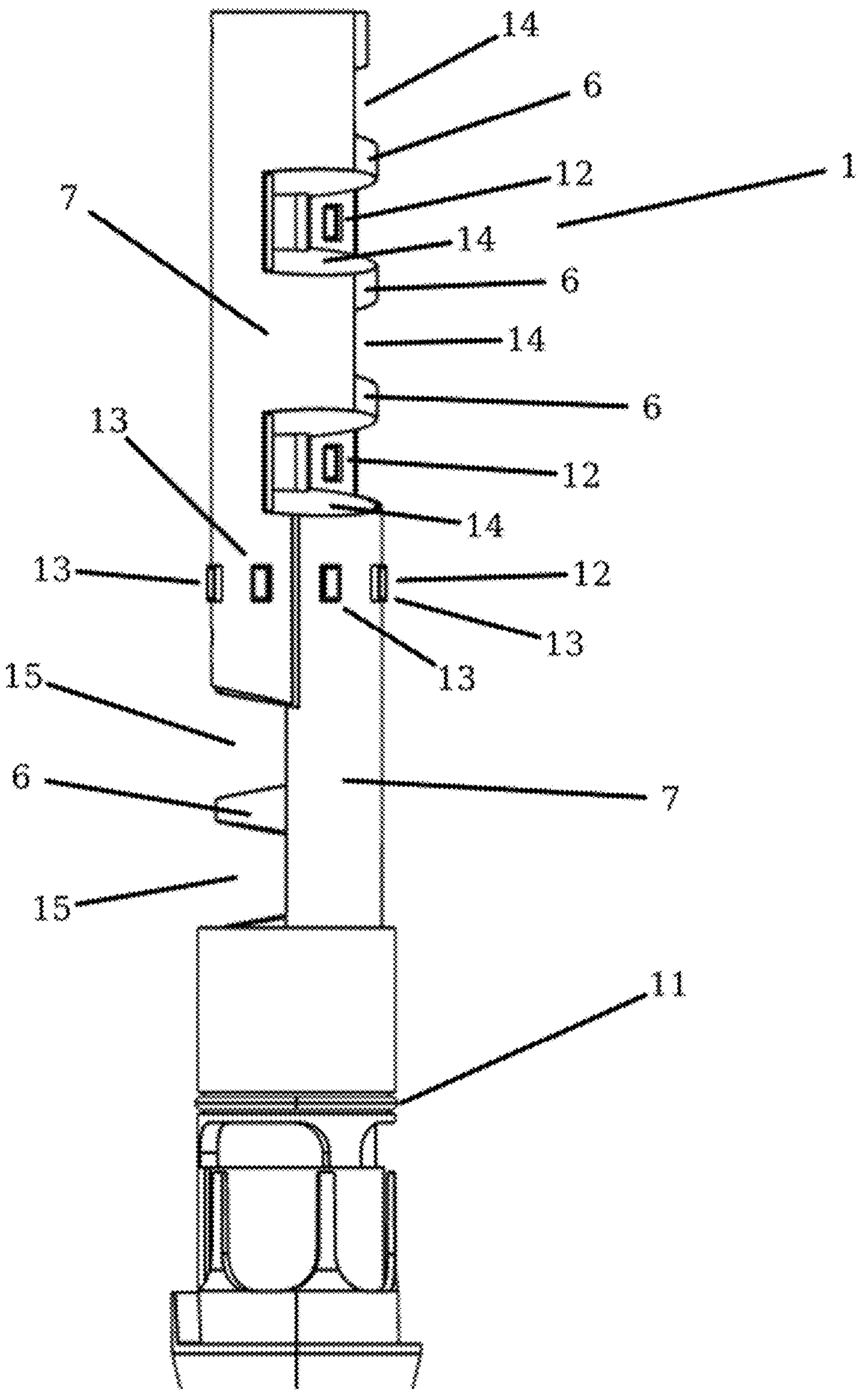
FIG. 5 shows a left side view of the exemplary navigation light with multiple LEDs, core, and core openings.

FIG. 5 is a left side view of the navigation light 1 with various components labeled. Central to the structure is the core 6, which houses several key elements of the navigation light. The flexible circuit 7 is attached to the core 6, e.g., with double-sided acrylic adhesive tape, such as VHB tape, or "Very High Bond" tape, a double-sided acrylic foam tape made by, e.g., 3M, and provides the electrical connections for the LEDs 12, 13, 16. The O-ring 11 encircles a segment of the core 6, providing a seal to protect internal electronics during manufacturing.

The exemplary navigation light 1 shown has 225-degree LEDs 12, 360-degree LEDs 13, and 135-degree LEDs 16. The 225-degree LEDs 12 are mounted in specific locations along the flexible circuit 7 to provide targeted illumination for the 225-degree mast light pattern, while the 360-degree LEDs 13 provide 360-degree all-around illumination. The 135-degree LEDs 16 provide 135-degree illumination for the 135-degree stern light pattern.

The core 6 features upper core openings 14 and lower core openings 15. These openings permit light from the 225-degree LEDs 12 and 135-degree LEDs 16 on the inside of the flexible circuit 7 to pass through the core 6 and mask the light from these LEDs 12, 16 (cooperating with the flexible circuit 7) in a way to provide proper 225-degree and 135-degree light patterns from the navigation light 1. Two of the 225-degree LEDs 12 are mounted on the inside of the flexible circuit 7 and are shown through respective upper core openings 14 in FIG. 5. The 360-degree LEDs 13 are on the outside of the flexible circuit 7. One LED on the outside of the flexible circuit 7 labeled with both 12 and 13 in FIG. 5 contributes to both the 225-degree masthead light pattern and the 360-degree all-around light pattern.

Figure 6:
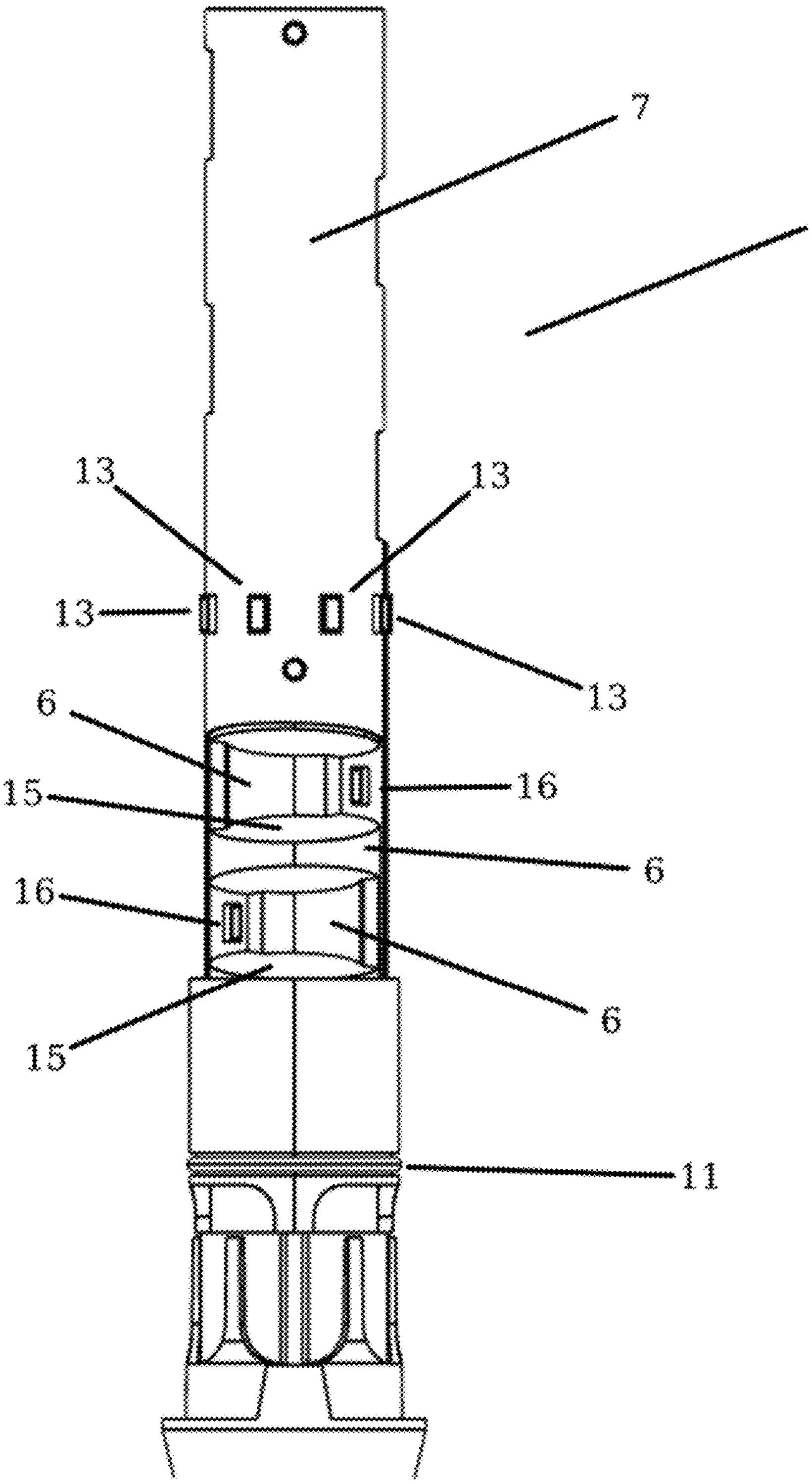
FIG. 6 shows a rear view of the navigation light of FIG. 5.
Figure 7:
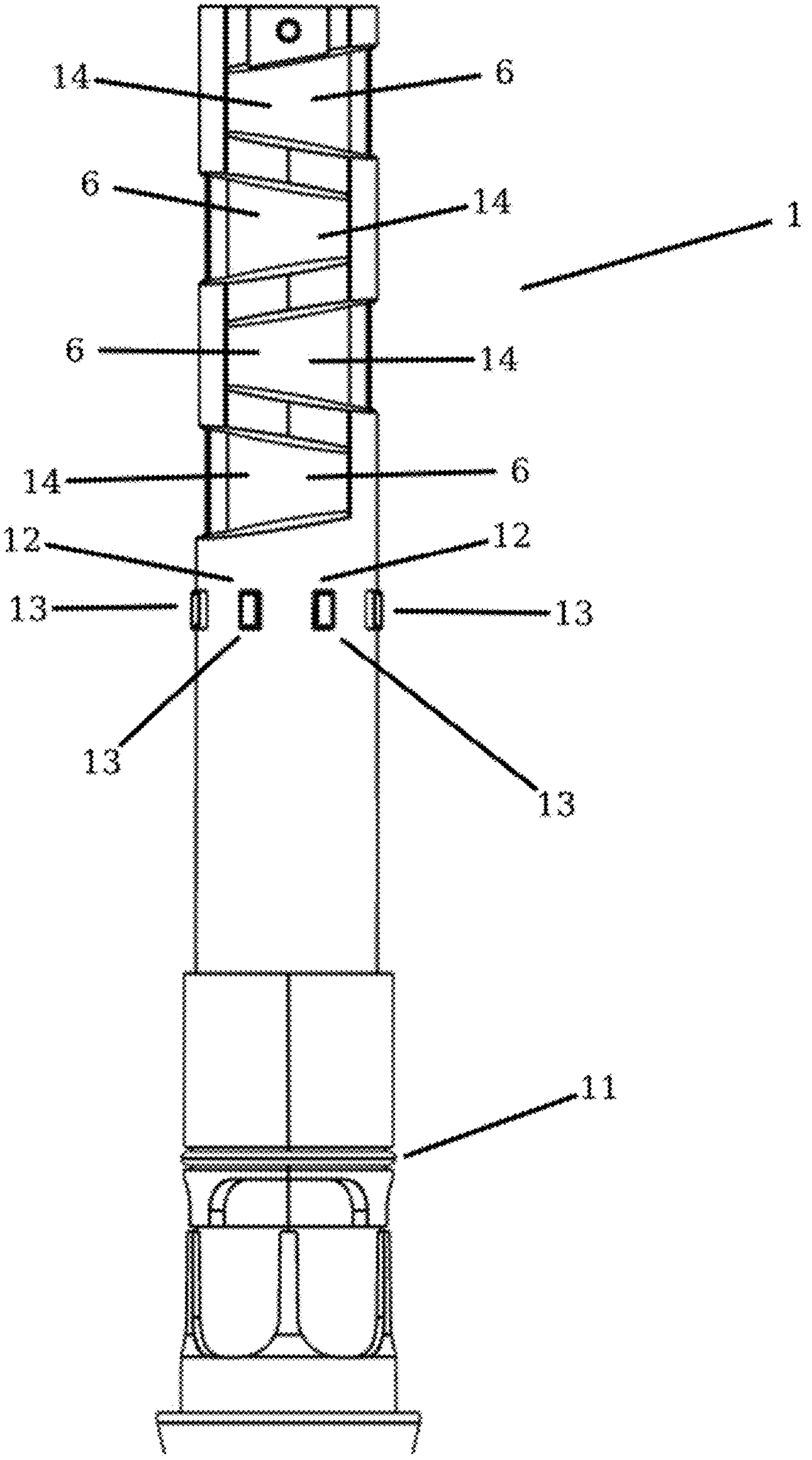
FIG. 7 shows a front view of the navigation light of FIG. 5.

Turning to FIG. 6, this figure illustrates a rear view of the exemplary navigation light 1, detailing the positional layout of additional components. Similar to FIG. 5, the core 6 serves as the primary structure for the flexible circuit 7. Four of the 360-degree LEDs 13 and both of the 135-degree LEDs 16 are shown in FIG. 6. The two 135-degree LEDs 16 are mounted on the inside of the flexible circuit 7 and are shown through respective lower core openings 15 in FIG. 6. The 360-degree LEDs 13 are on the outside of the flexible circuit 7.

The O-ring 11 is depicted providing sealing around the lower part of the core 6.

Figure 8:
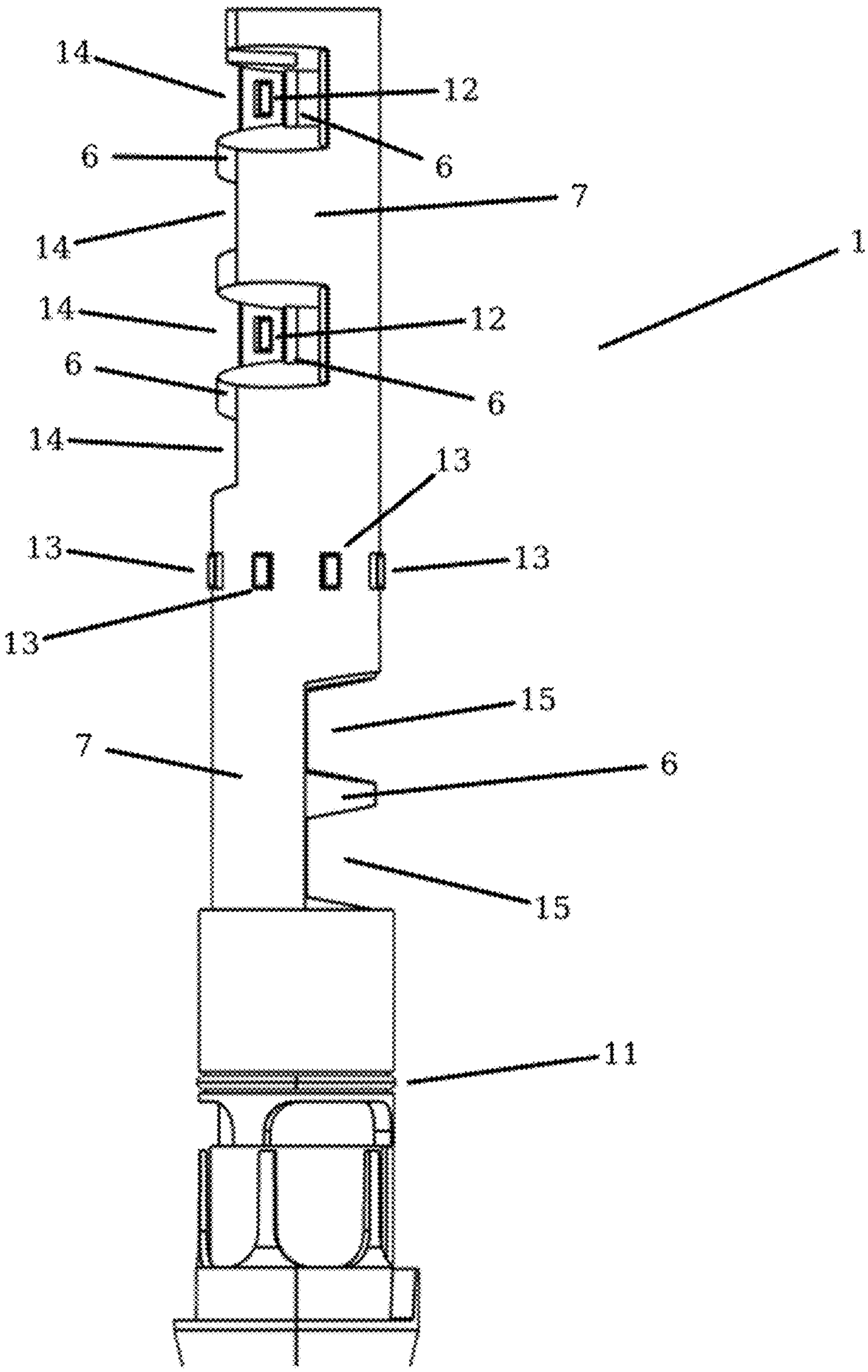
FIG. 8 shows a right-side front view of the navigation light of FIG. 5.

FIG. 7 is a front view of the navigation light 1. Again, the core 6 supports the flexible circuit 7. None of the upper 225-degree LEDs 12 are shown through respective upper core openings 14 in FIG. 7 (they are off to the side, as seen in FIG. 5 and FIG. 8). Four of the 360-degree LEDs 13 (two of which also function as 225-degree LEDs 12) are shown on the outside of the flexible circuit 7 in FIG. 7. Two of the LEDs on the outside of the flexible circuit 7 are labeled with both 12 and 13 in FIG. 7; they contribute to both the 225-degree masthead light pattern and the 360-degree all-around light pattern.

FIG. 8 is a right-side view of the navigation light 1. Similar to FIGS. 5-7, the core 6 serves as the primary structure for the flexible circuit 7. Two of the 225-degree LEDs 12 are mounted on the inside of the flexible circuit 7 and are shown through respective upper core openings 14 in FIG. 8. The 360-degree LEDs 13 are on the outside of the flexible circuit 7. One LED on the outside of the flexible circuit 7 labeled with both 12 and 13 in FIG. 8 contributes to both the 225-degree masthead light pattern and the 360-degree all-around light pattern.

Figure 9:
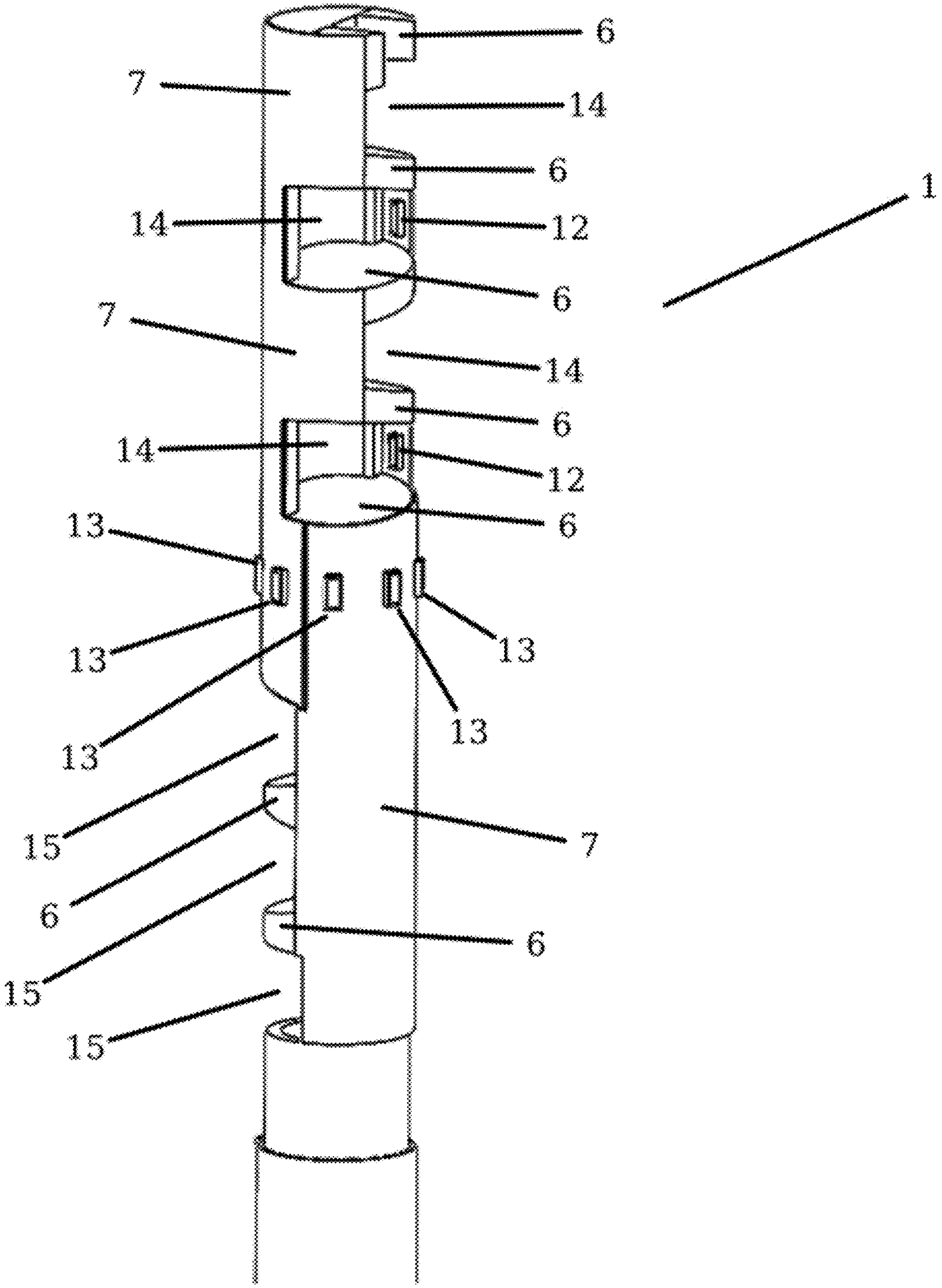
FIG. 9 shows a front/left/top perspective view of the navigation light of FIG. 5.

FIG. 9 is a perspective view showing many of the components discussed in connection with FIG. 5-8.

In summary, FIGS. 5-9 collectively demonstrate the detailed construction of the navigation light 1, emphasizing the integration of the core 6, various LEDs (including the 225-degree LEDs 12, 360-degree LEDs 13, and 135-degree LEDs 16), flexible circuit 7, and O-ring 11. The upper core openings 14 and lower core openings 15 allow light to pass through the core 6 and mask that light to provide proper 225-degree and 135-degree light patterns.

The combined light from the 225-degree LEDs 12 creates the 225-degree masthead light pattern by being strategically positioned in the navigation light 1: some on the inside of the flexible circuit 7 and some on the outside of the flexible circuit 7. Each 225-degree LED 12 is precisely oriented to emit light within a specific sector that contributes to the overall 225-degree illumination required for masthead light compliance. The emitted light from some of these LEDs passes through the relevant upper core openings 14, which are engineered to shape and guide the light into the desired pattern. The core itself acts as a mask, along with the flexible circuit 7, ensuring that the light is cut off sharply at the 225-degree boundaries, preventing any spillover that might blur the required cutoff angles. The design of the core openings aids in blocking unwanted light spill, focusing the beam to meet regulatory masthead lighting standards. Together with the flexible circuit 7, this arrangement ensures that the light intensity and directional patterns conform to maritime safety requirements. Additionally, the core 6 assists in thermal management, dissipating heat from the LEDs to maintain consistent performance.

The light from the 360-degree LEDs 13 on the outside of flexible circuit 7 creates the 360-degree light pattern by being strategically positioned to face outward, thereby maximizing their light output in a circumferential pattern around the navigation light assembly. Specifically, each LED 13 is placed on the exterior of the flexible circuit 7, ensuring that the emitted light radiates unimpeded by other internal components. This layout guarantees a clear and consistent light distribution necessary for achieving a complete 360-degree visibility as mandated for marine navigation lights.

The outward-facing orientation of the 360-degree LEDs 13 ensures that light travels directly outward and evenly around the full circumference of the navigation light assembly. This configuration minimizes any potential shadowing or light blockage that could occur if the LEDs were positioned inward or in a different orientation. Additionally, the strategic alignment of the LEDs 13 on the flexible circuit 7 ensures that the light emitted by each LED overlaps with that of adjacent LEDs, thereby creating a seamless and uniform 360-degree light pattern.

Furthermore, the placement of the 360-degree LEDs 13 on the outer surface allows more efficient integration with external optical components, such as lenses or diffusers. These components can be used to further fine-tune and direct the light output, ensuring that the generated light pattern meets specific regulatory photometric standards.

The thermal management is also enhanced by this configuration, as the heat generated by the LEDs 13 is more efficiently dissipated into the surrounding environment from their position on the exterior of the flexible circuit 7. This helps to maintain the performance and longevity of the LEDs.

In summary, the 360-degree LEDs 13 on the outside of the flexible circuit 7 are positioned and oriented to emit light outward in all directions around the navigation light assembly, creating a consistent and compliant 360-degree light pattern essential for marine navigation.

The light from the 135-degree LEDs 16 creates the 135-degree stern light pattern by being strategically positioned within the core and flexible circuit such that their light output is directed through the lower core openings 15. Each 135-degree LED 16 is precisely oriented to emit light within a specific sector that contributes to the overall 135-degree illumination required for the 135-degree stern light pattern.

The emitted light from these 135-degree LEDs passes through the relevant lower core openings 15, which are engineered to shape and guide the light into the desired pattern. The core itself acts as a mask, along with the flexible circuit 7, ensuring that the light is cut off sharply at the 135-degree boundaries, preventing any spillover that might blur the required cutoff angles. This configuration aids in blocking unwanted light spill, which is achieved by shaping the light output through precise geometrical openings. This results in a more controlled and directed illumination that meets regulatory stern lighting standards. Additionally, the core assists in thermal management, dissipating heat from the LEDs to maintain consistent performance.

Together with the flexible circuit, this arrangement ensures that the light intensity and directional patterns conform to maritime safety requirements. This strategic placement and orientation of the LEDs, in combination with the core's optical shaping properties, ensure that the stern light pattern is clear, focused, and compliant with international marine navigation standards.

In the detailed construction of the navigation light 1, the 225-degree LEDs 12 extend into the upper core openings 14. Specifically, this extension allows the LEDs to be positioned within the core such that the emitted light is directed through these upper core openings 14. By extending into these openings, the 225-degree LEDs 12 are strategically placed to achieve the focused and sharp cutoff angles required for marine navigation applications.

The upper core openings 14 act as conduits for the LED light, ensuring the light output conforms to regulatory standards for masthead lighting. This configuration aids in blocking unwanted light spill, which is achieved by shaping the light output through precise geometrical openings. This results in a more controlled and directed illumination that meets the marine safety specifications. Additionally, this arrangement also facilitates effective thermal management, as the core can assist in dissipating heat generated by the LEDs, ensuring consistent performance and longevity of the navigation light.

The 135-degree LEDs 16 extend into the lower core openings 15. This specific extension allows the LEDs to be positioned within the core such that the emitted light is directed through these lower core openings 15. By extending into these openings, the 135-degree LEDs 16 are strategically placed to achieve the focused and sharp cutoff angles required for marine navigation applications.

The lower core openings 15 act as conduits for the LED light, ensuring that the light output conforms to regulatory standards for stern lighting. This configuration aids in blocking unwanted light spill, which is achieved by shaping the light output through precise geometrical openings. This results in a more controlled and directed illumination that meets the maritime safety specifications. Additionally, this arrangement facilitates effective thermal management, as the core can assist in dissipating heat generated by the LEDs, ensuring consistent performance and longevity of the navigation light.

In some exemplary embodiments, the 360-degree LEDs are positioned on the outside of the flexible circuit. This arrangement allows the LEDs to face outward, thereby maximizing the light output in a circumferential pattern around the navigation light assembly. By placing the LEDs on the exterior of the flexible circuit, the emitted light can travel unimpeded by any internal components, ensuring a clear and consistent light distribution necessary for meeting the 360-degree visibility requirements mandated for marine navigation lights.

The location of these LEDs on the outer surface of the flexible circuit helps in achieving a uniform light output across the entire 360-degree coverage area. This layout minimizes any potential shadowing or light blockage that might occur if the LEDs were oriented differently or positioned inward. Additionally, the outward-facing LEDs can more easily integrate with external optical components, such as lenses or diffusers, to further refine and direct the light output to meet specific regulatory photometric standards.

Thermal management is also facilitated by this configuration, as the heat generated by the LEDs on the outer surface of the flexible circuit can dissipate more efficiently into the surrounding environment. This arrangement can enhance the overall lifetime and performance of the LEDs by preventing overheating.

In some exemplary embodiments, the 360-degree LEDs 13 are positioned such that a portion of their light output also contributes to the 225-degree masthead light pattern. This dual function is achieved through the strategic placement and orientation of these LEDs within the flexible circuit and core openings.

Specifically, the 360-degree LEDs 13, while facing outward to provide 360-degree illumination, are positioned at angles where their light overlaps with the intended 225-degree masthead pattern. By optimizing the placement of these LEDs, the emitted light within the 225-degree sector is maximized, creating the necessary intensity and coverage for the masthead light pattern.

Each of the dual 360-degree LEDs 12, 13, by design, has portions of its light output that naturally fall within the 225-degree range required for the masthead pattern. Thus, the light produced by these LEDs serves dual functions, contributing to both patterns without the need for separate LEDs dedicated exclusively to the masthead light.

The flexible circuit's layout ensures that the 360-degree LEDs 13 are appropriately aligned and that their overlapping light output is harnessed efficiently. Through this design, the navigation light assembly achieves the required angular coverage and intensity specifications for both the 360-degree and the 225-degree masthead light patterns with fewer individual LEDs.

Figure 10:
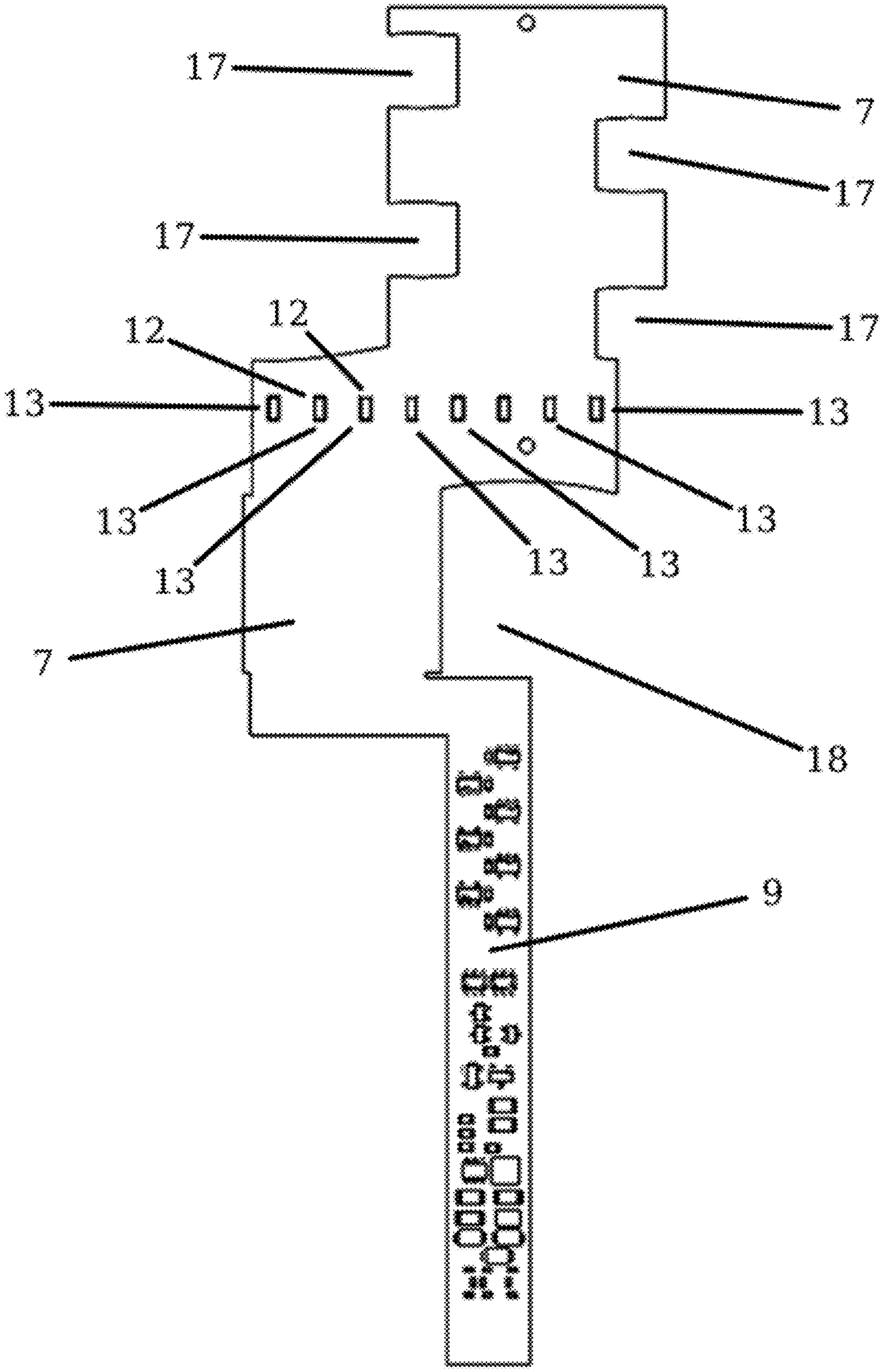
FIG. 10 is an outward facing view of an exemplary flexible circuit in a flat configuration showing the 360-degree LEDs 13 and showing that two of the 360-degree LEDs 13 also function as 225-degree LEDs 12.
Figure 11:
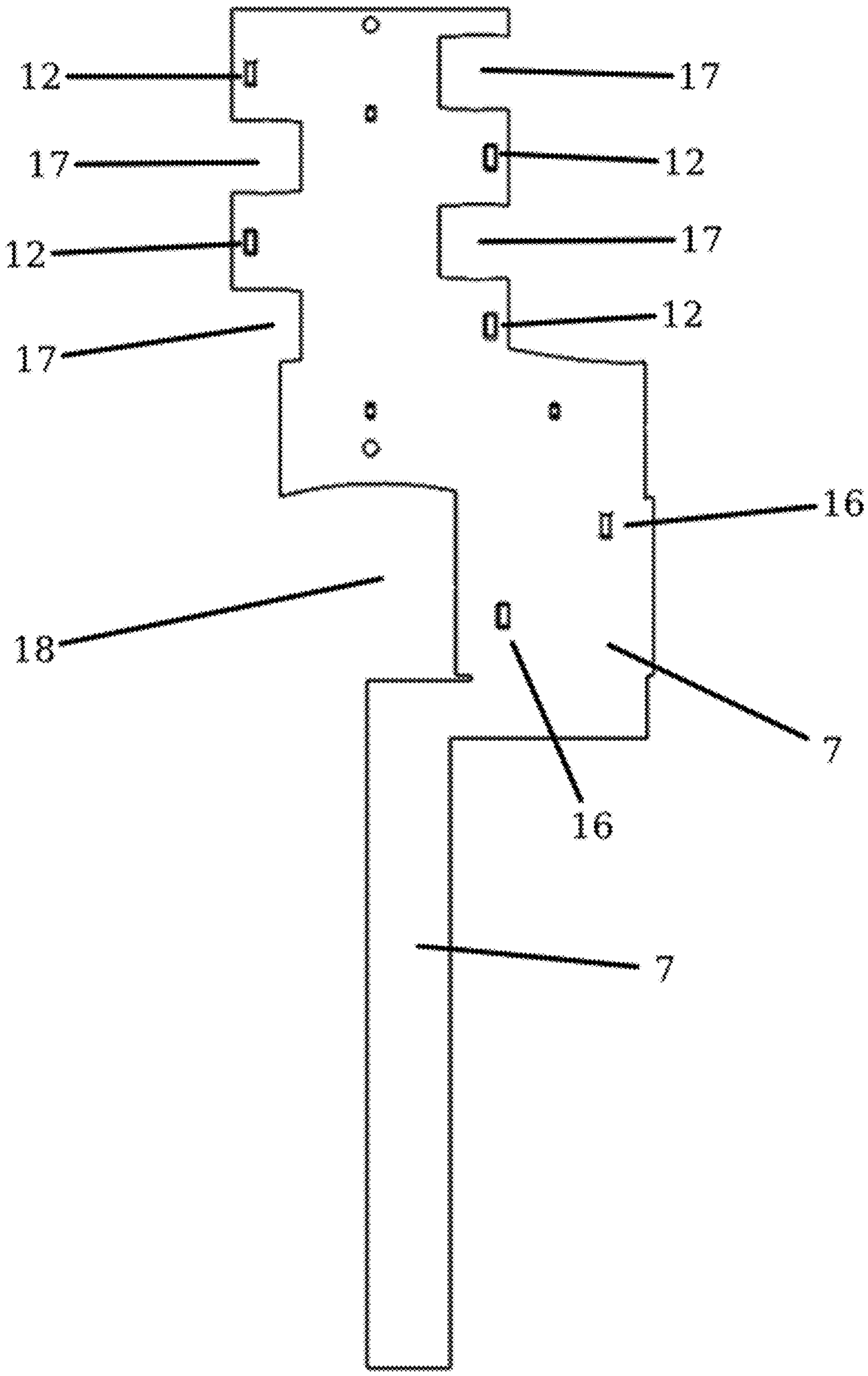
FIG. 11 is an inward facing view (facing the core) of the flexible circuit of FIG. 10 in the flat configuration, showing the inward facing 225-degree LEDs 12 and the optional 135-degree LEDs 16, which are inward facing in this exemplary embodiment.

FIGS. 10-11 present front and back views of an exemplary embodiment of the flexible circuit 7. FIG. 10 is an outward facing view of flexible circuit 7 in a flat configuration (facing outward away from core 6 when the flexible circuit 7 is wrapped around and affixed to core 6) and FIG. 11 is an inward facing view of the flexible circuit 7 of FIG. 10 in the flat configuration (facing inward toward core 6 when wrapped around and affixed to core 6). FIGS. 10-11 shows the 225-degree LEDs 12, the 360-degree LEDs 13, and optional 135-degree LEDs 16. FIG. 10 illustrates eight 360-degree LEDs 13 and shows that two of the eight 360-degree LEDs 13 also function as two 225-degree LEDs 12 positioned strategically to complement the other 360-degree LEDs 13 and the other 225-degree LEDs 12. Upper flex circuit openings 17 and a lower flex circuit opening 18 are incorporated here as seen in other Figures to allow light from the inward facing LEDs to leave the core 6 to provide and shape the light patterns. The LED drivers 9 are connected to power and control signals via wiring 19 (FIGS. 13-14).

FIG. 11 shows four inward facing 225-degree LEDs 12 positioned strategically around the inside of the flexible circuit 7. In this exemplary embodiment, the core 6 creates the angle cutoffs for the light patterns; however, the flexible circuit 7 could do this in other embodiments. The position of the LEDs 12 on the flexible circuit 7 helps affect the intensity over the arc of the 225-degree light pattern and the cut-off angle as well. The arrangement also features two 135-degree LEDs 16. The position of the LEDs 16 on the flexible circuit 7 helps affect the intensity over the arc of the 135-degree light pattern and the cut-off angle as well. In this exemplary embodiment, the flexible circuit 7 has four upper flex circuit openings 17 permitting light from the four inward facing 225-degree LEDs 12 to exit the navigation light 1. Additionally, in this exemplary embodiment, the flexible circuit 7 has a large lower flex circuit opening 18 permitting light from the two 135-degree LEDs 16 to exit the navigation light 1.

Figure 12:
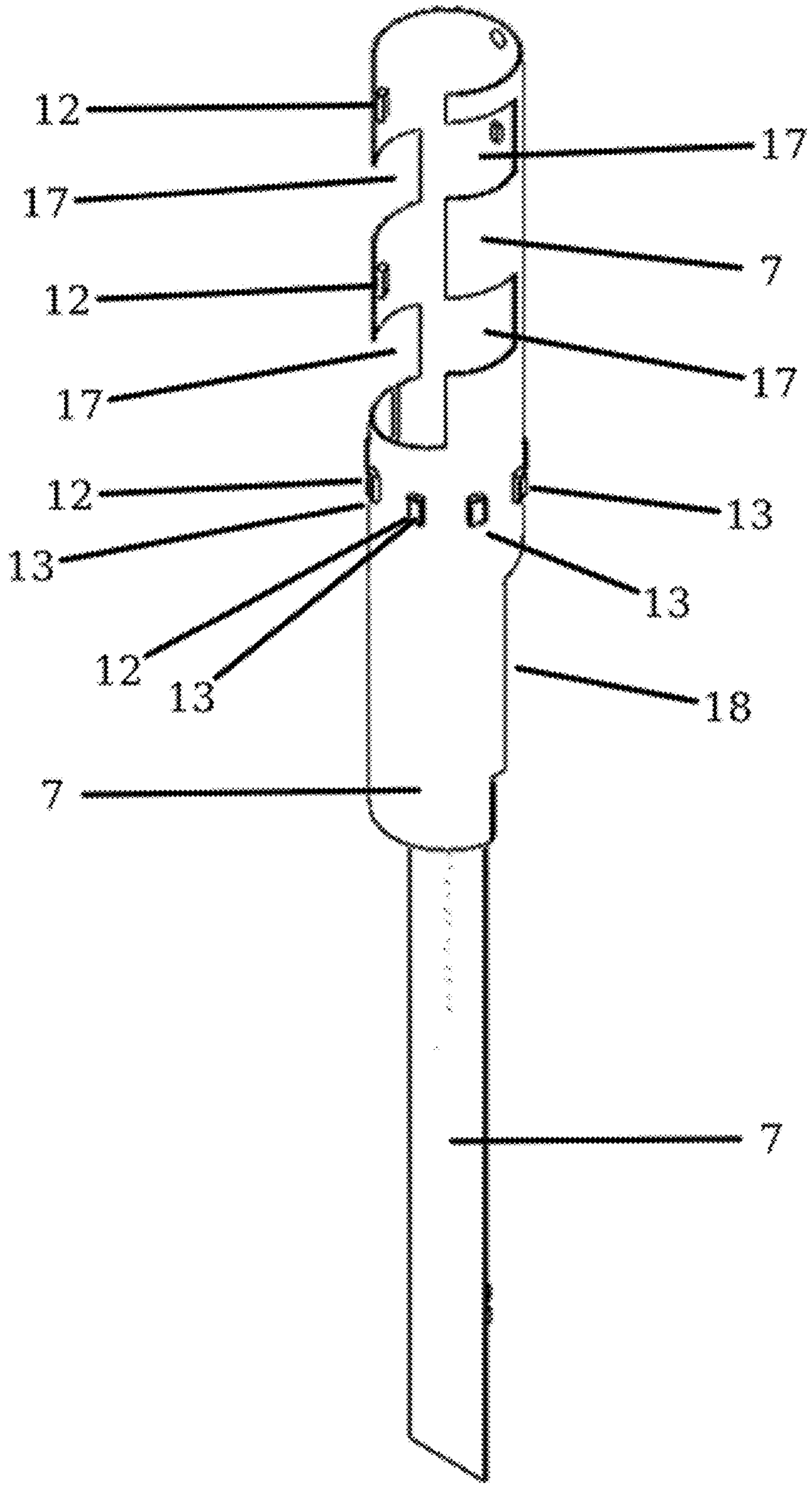
FIG. 12 is a perspective view of the flexible circuit in FIGS. 10-11, shown curved as though wrapped around a core.

FIG. 12 provides a perspective view of the previously illustrated flexible circuit 7, curved as though wrapped around a cylindrical core. The flexible circuit 7 when flexed and curved around the core 6 maintains its structural integrity and functional layout. Upper flex circuit openings 17 and a lower flex circuit opening 18 are visible, underscoring their utility in allowing light to exit the core 6 and helping to maintain proper cutoffs of the different light patterns, i.e., the 225-degree masthead light pattern and the 135-degree stern light pattern. A lower portion of the flexible circuit 7 carries the LED drivers 9 and remains flat in this exemplary embodiment. As can be seen in FIGS. 10-12, the flexible circuit 7 extends downward much lower at the rear than at the front of the navigation light 1 because of the lower flex circuit opening 18.

Figure 13:
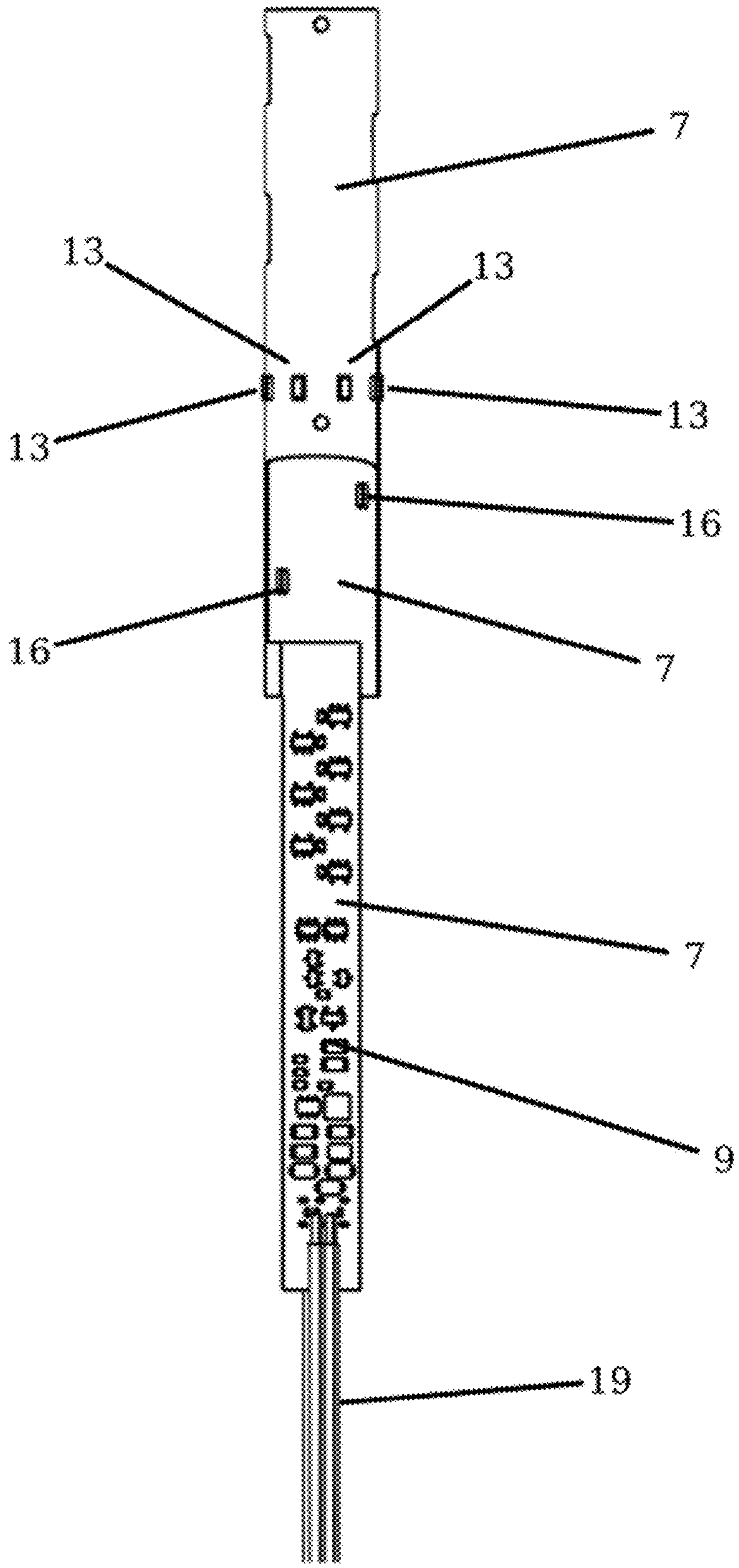
FIG. 13 is a rear view of the flexible circuit in FIGS. 10-11, shown curved as though wrapped around a core.
Figure 14:
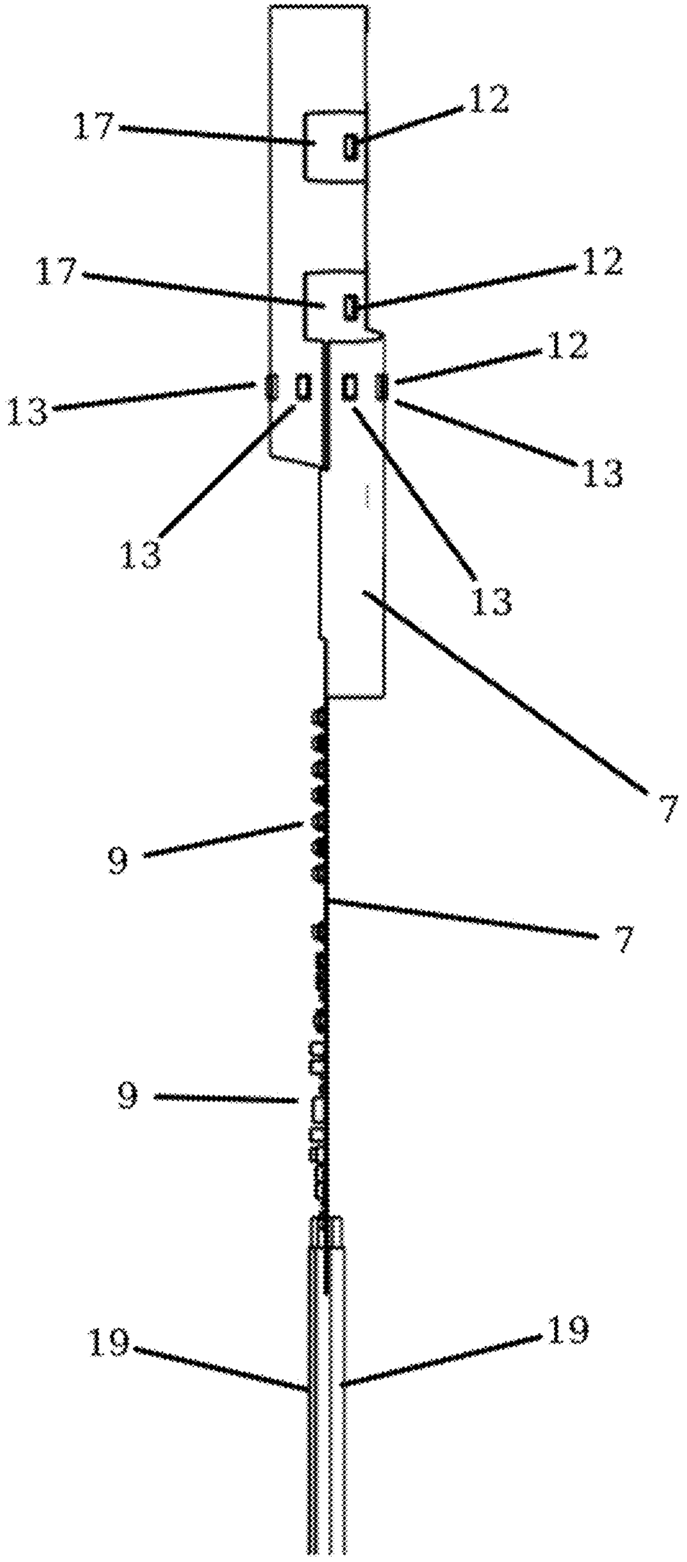
FIG. 14 is a right-side view of the flexible circuit in FIGS. 10-11, shown curved as though wrapped around a core.
Figure 15:
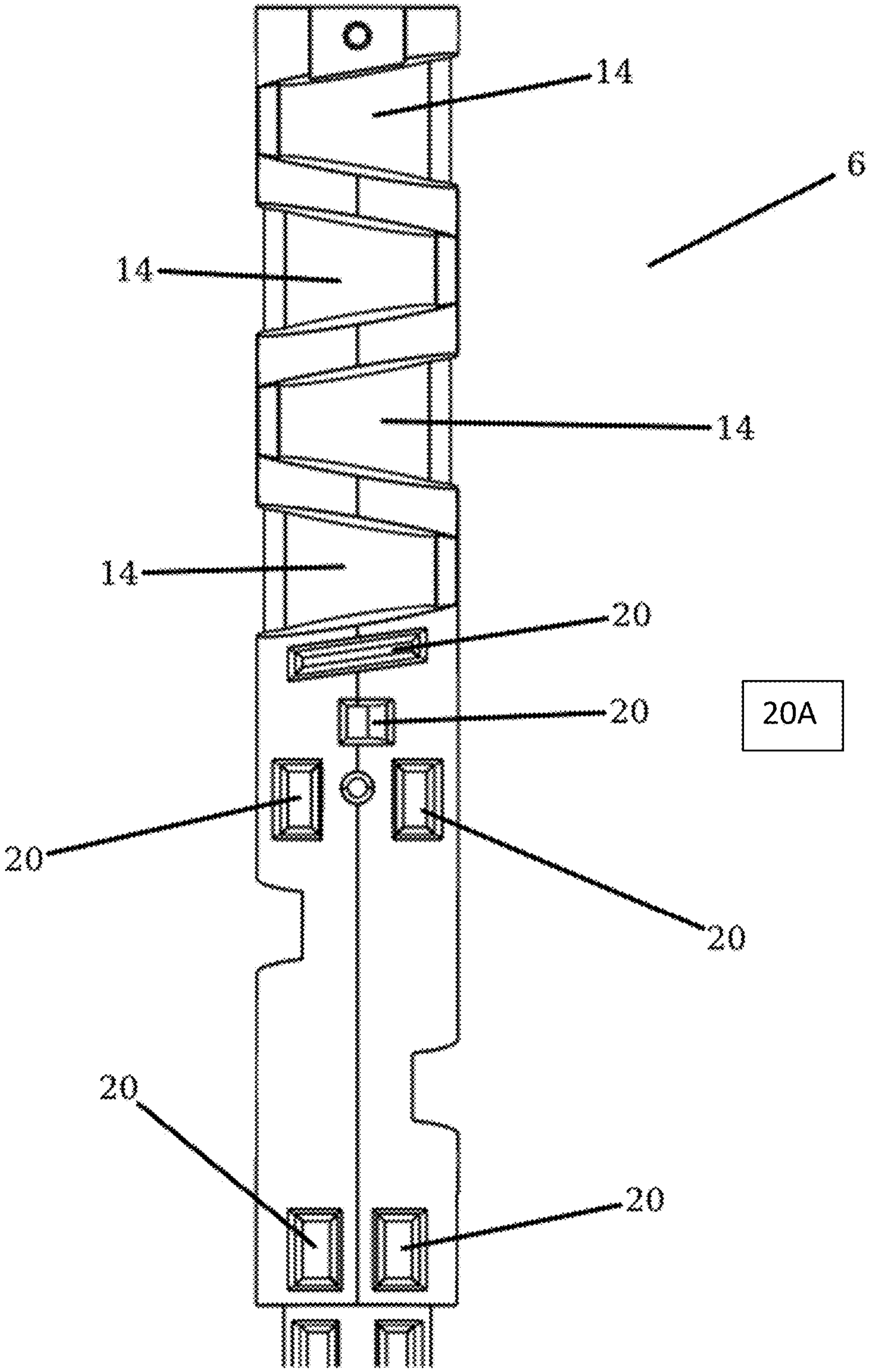
FIG. 15 is a front view depicting the core with several upper core openings and multiple core indentations.
Figure 16:
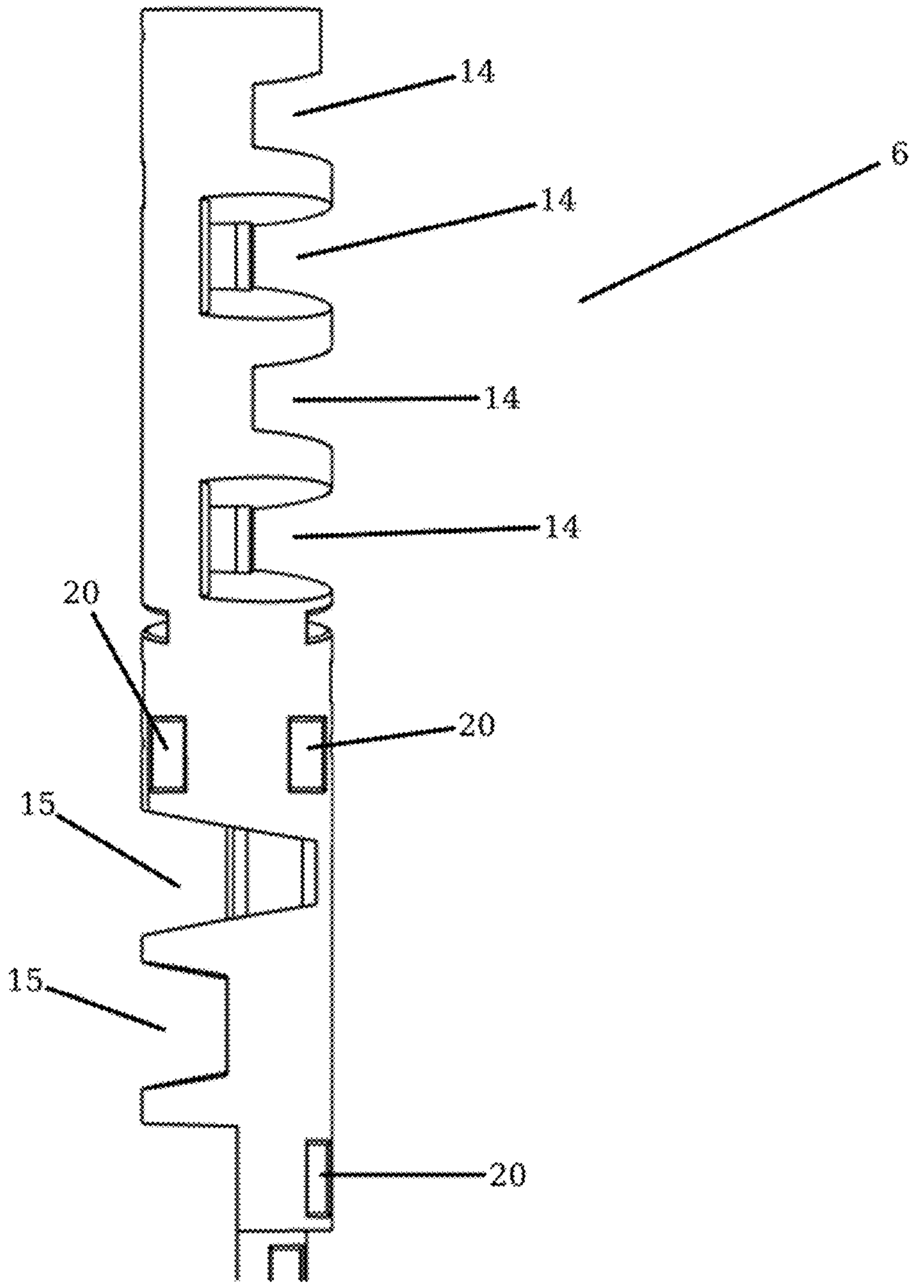
FIG. 16 is a left side view of the core showcasing the upper core openings, lower core openings, and various core indentations.
Figure 17:
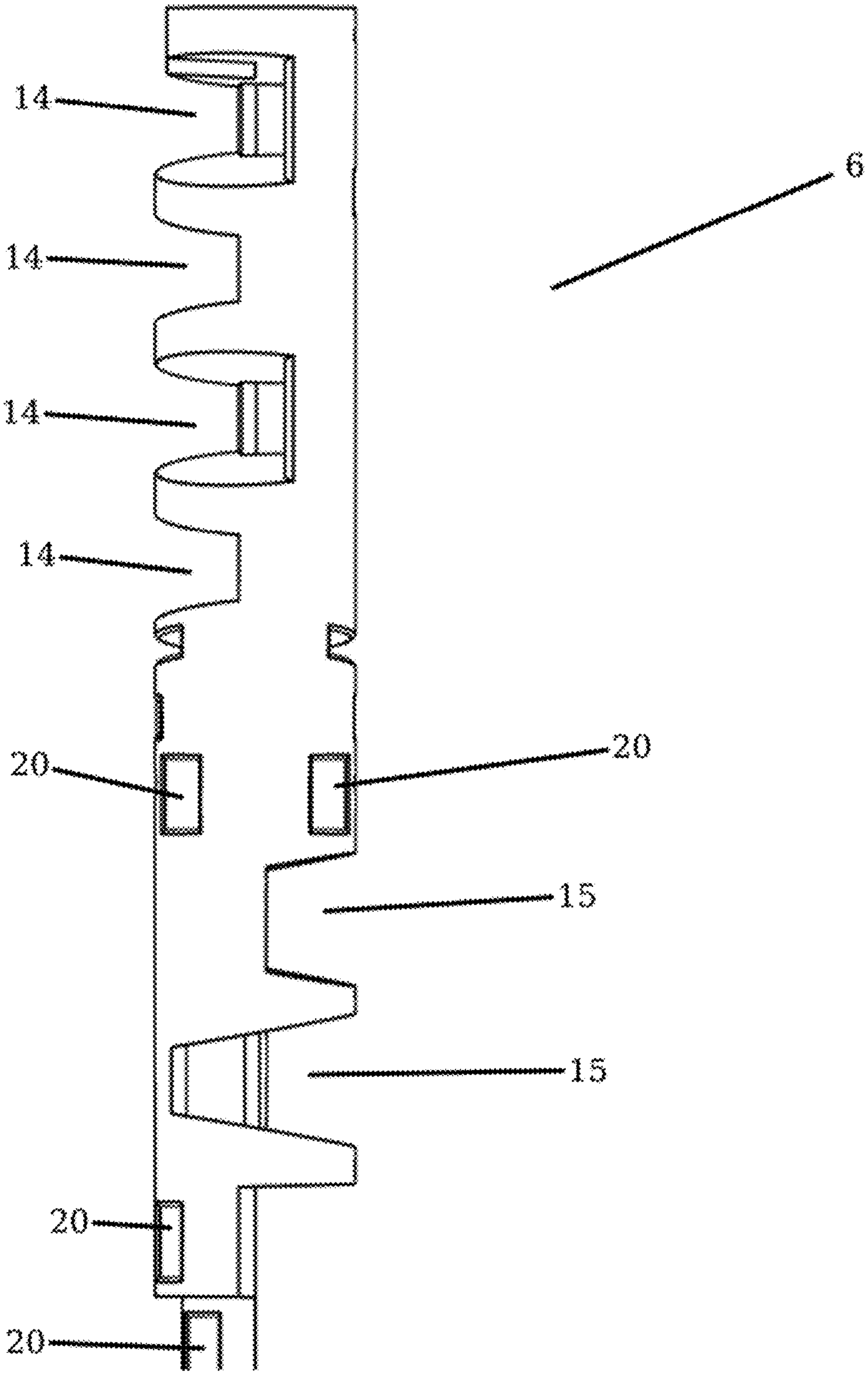
FIG. 17 is a right-side view of the core displaying the upper core openings, lower core openings, and several core indentations.

Turning to FIGS. 13-14, these show rear and right-side views of the previously illustrated flexible circuit 7, again curved as though wrapped around a cylindrical core 6. The lower portion of the flexible circuit 7 carrying the LED drivers 9 is not curved around the substantially cylindrical core 6 and is shown as being on a virtual plane that would bisect the core 6 (not shown) in this embodiment.

Figure 18:
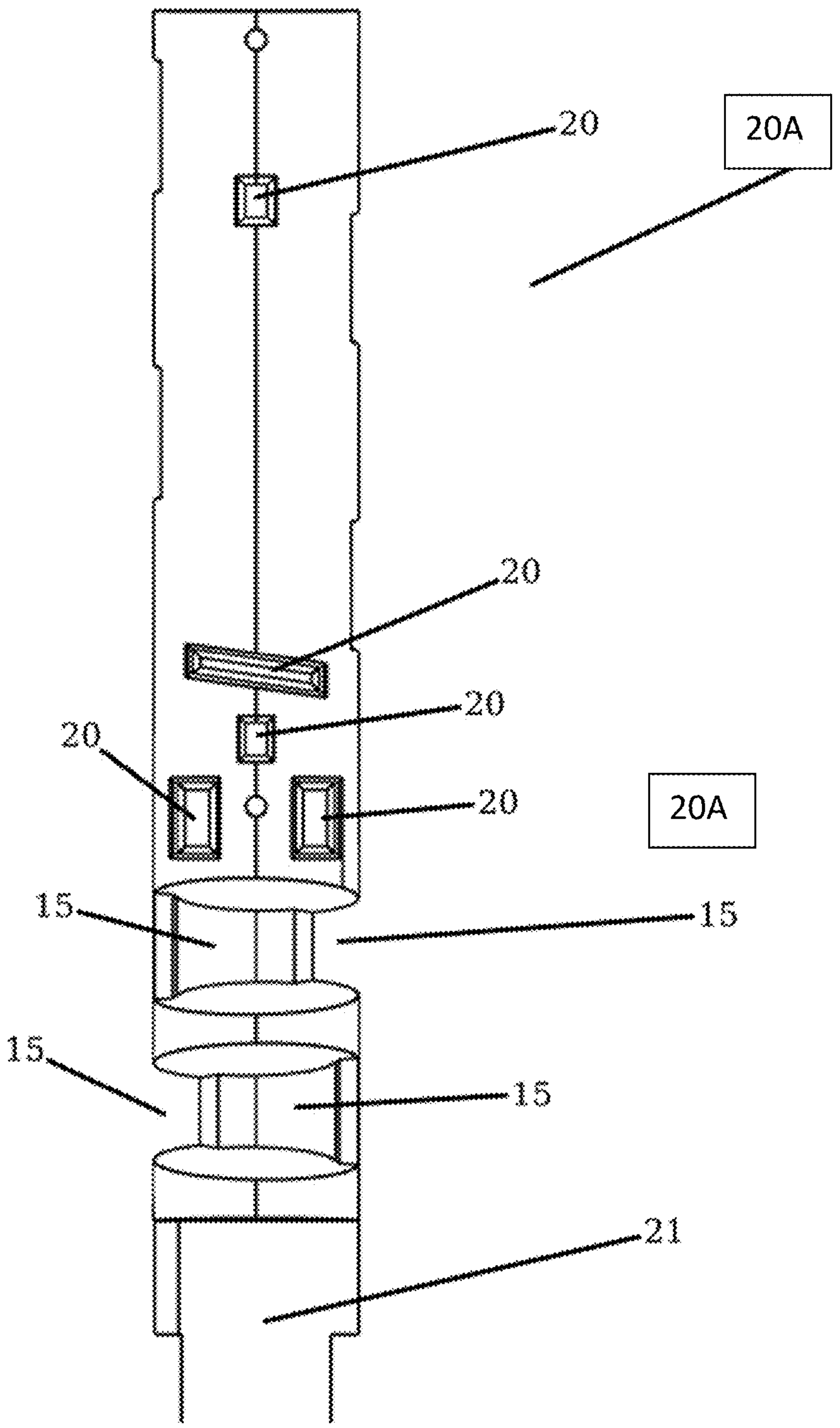
FIG. 18 is a rear view of the core illustrating the lower core openings, core indentations, and a planar portion for the portion of the flexible circuit that carries the LED drivers.
Figure 19:
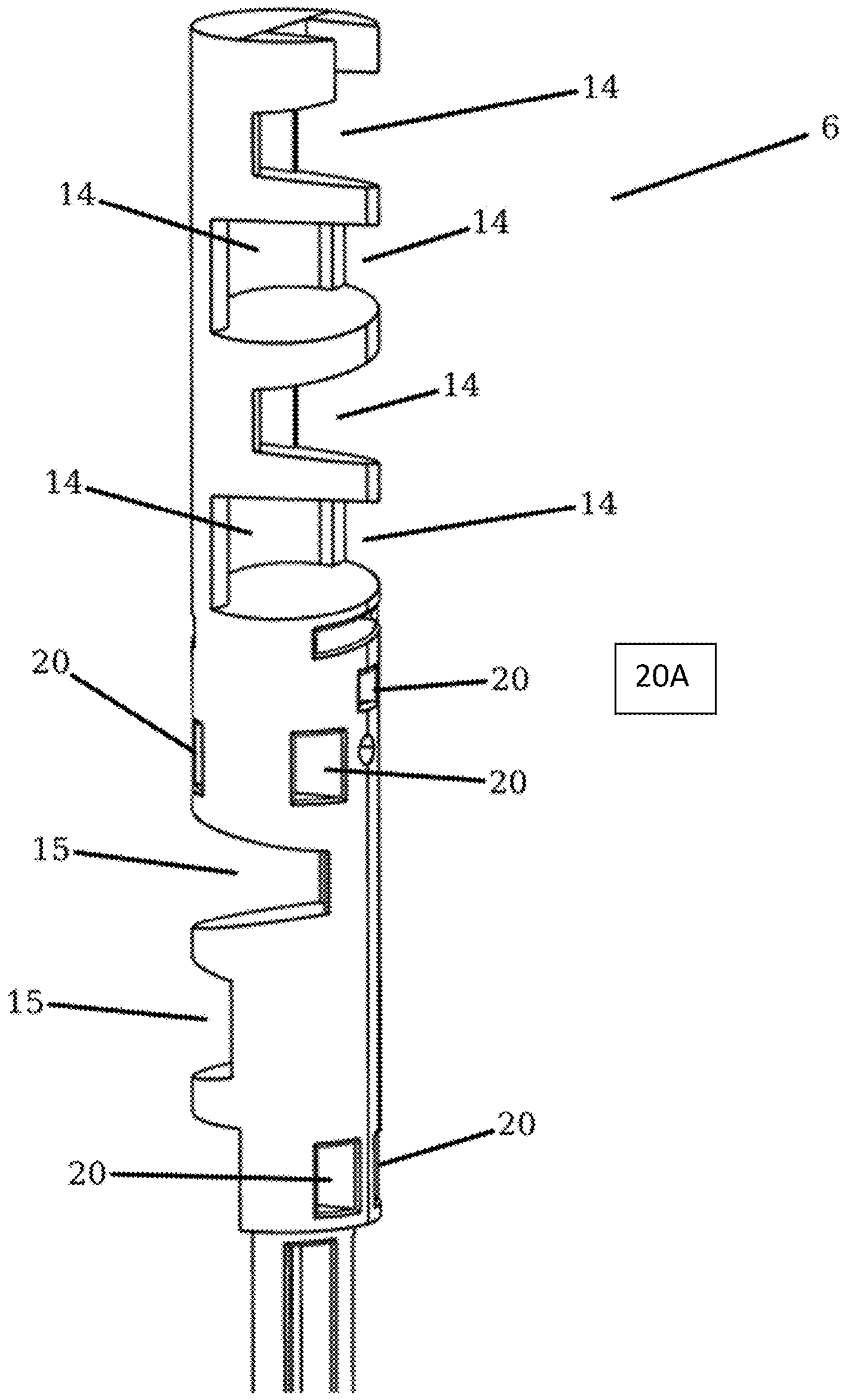
FIG. 19 shows a front/left/top perspective view of the core showing upper core openings, lower core openings, and including core indentations.

Turning to FIGS. 15-19, these figures show various views of the exemplary core 6 of this exemplary navigation light 1. The exemplary core 6 is substantially cylindrical or slightly frustoconical (still substantially cylindrical) and includes upper core openings 14, lower core openings 15, and core indentations 20, distributed along the core 6 as shown. The core indentations 20 help reduce the mass of the core 6 and also provide voids for components on core side of the flexible circuit 7, if needed. FIG. 18 shows a planar portion 21 of the core 6, to which the lower portion of the flexible circuit 7 carrying the LED drivers 9 is be affixed. As shown best in FIGS. 23-26, internal edges of the upper core openings 14 and lower core openings 15 shape the light from the LEDs 8, 12, 16 to provide sharp cutoffs for the light patterns, e.g., the 225-degree and 135-degree light patterns.

Overall, the core 6, upper core opening 14, lower core opening 15, core indentations 20, and planar portion 21 form integral parts of the structure, consistently illustrated across the figures, revealing the technical cohesiveness and functionality of the design. The elements are designed to ensure optimal performance and integration within a larger assembly, each playing a specific role in the system's operation.

Figure 20:
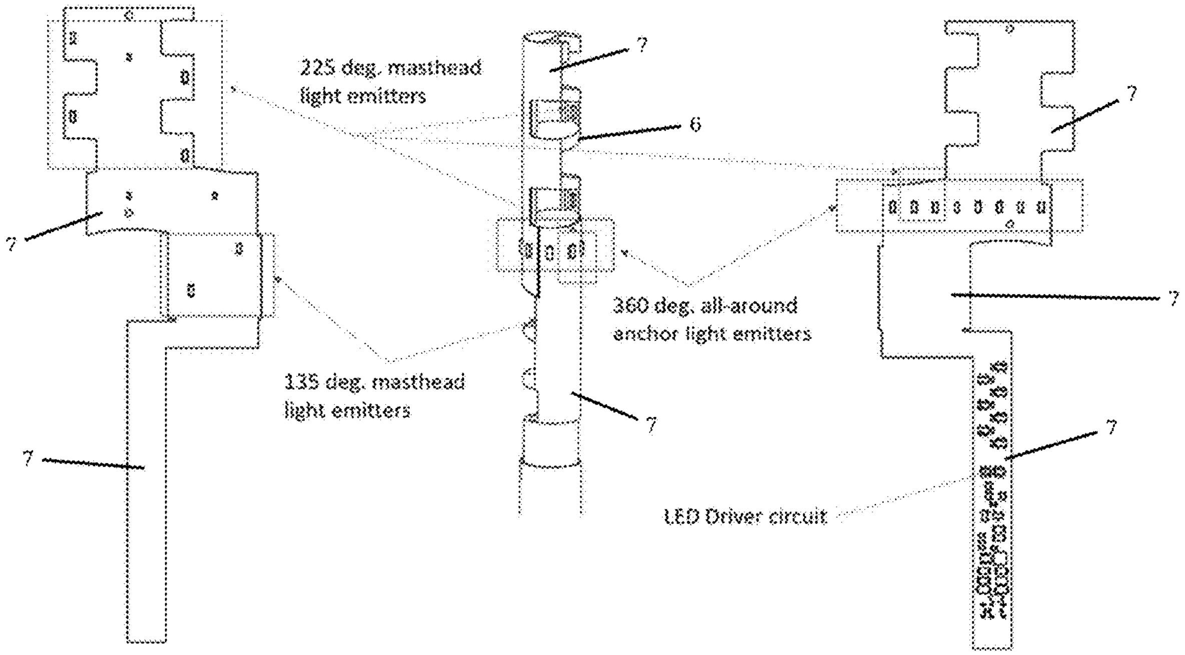
FIG. 20 shows the various LED groupings in this exemplary navigation light.

FIG. 20 shows a detailed view of the exemplary flexible circuit 7 as though wrapped around a core 6, showing which LEDs help form which light pattern(s) in this exemplary embodiment. The flexible circuit 7 carries and distributes power to the various LEDs, which are strategically placed to create different light patterns for marine navigation.

The core 6 acts as a structural and thermal component around which the flexible circuit 7 is wrapped and affixed, e.g., with adhesive such as double-sided acrylic tape, e.g., VHB tape. The flexible circuit 7 includes defined sections for specific navigation lighting functionalities. Each section of the flexible circuit 7 features LED emitters facing either inward toward the core 6 or outward away from the core, forming precise light patterns for navigation.

In the upper portion of the illustration, labeled as the 225-degree masthead light emitters, the flexible circuit 7 is arranged with LEDs oriented to meet the required luminescence distribution for this segment. This section demonstrates how the flexible circuit 7 can be shaped to follow the contours of core 6, enabling accurate light pattern production for masthead lighting.

In the middle portion, indicated by the label for the 360-degree all-around anchor light emitters, the flexible circuit 7 is again utilizes LEDs positioned to provide a full 360-degree lighting pattern. The configuration ensures consistent light emission in all directions around the vessel, fulfilling the all-around anchor light requirements.

The bottom segment, marked as the 135-degree stern light emitters, illustrates another application of the flexible circuit 7. Here, the circuit accommodates the specific angles needed for the 135-degree stern light emission.

Additionally, FIG. 20 shows the LED driver circuit, also integrated into the flexible circuit 7. This portion of the flexible circuit 7 carries the necessary circuitry to drive the LEDs, allowing for controlled power delivery and management to ensure proper operation of all lighting components. This integration exemplifies how the flexible circuit 7 can be multifunctional, supporting both power distribution and control circuitry within the same structure.

Throughout the design shown in FIG. 20, the use of multiple segments of flexible circuit 7 wrapped around a core 6 highlights the adaptability and efficiency of using flexible printed circuits and a core with openings in marine navigation lights. This configuration allows for compactness and precise control of light patterns, which are essential for maritime safety.

Figure 21:
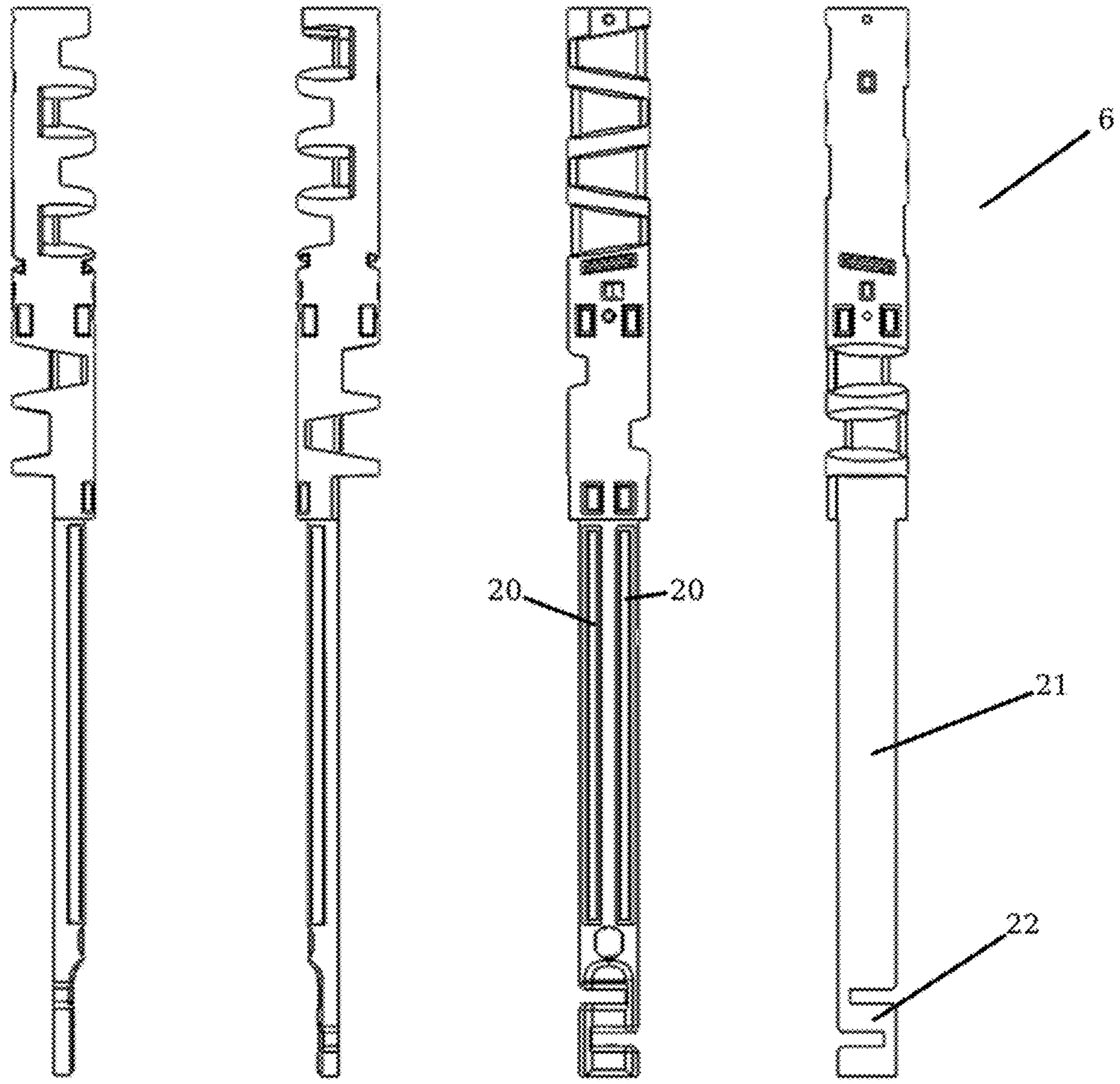
FIG. 21 various views of a piece that forms the core and a lower part, including the planar portion for the portion of the flexible circuit that carries the LED drivers.

FIG. 21 shows various orthogonal views of the exemplary core 6 integral to the described marine navigation light utilizing a flexible printed circuit for LED placement. The core 6 includes several important geometric features configured to accommodate and optimize the light's functionality.

Figure 22:
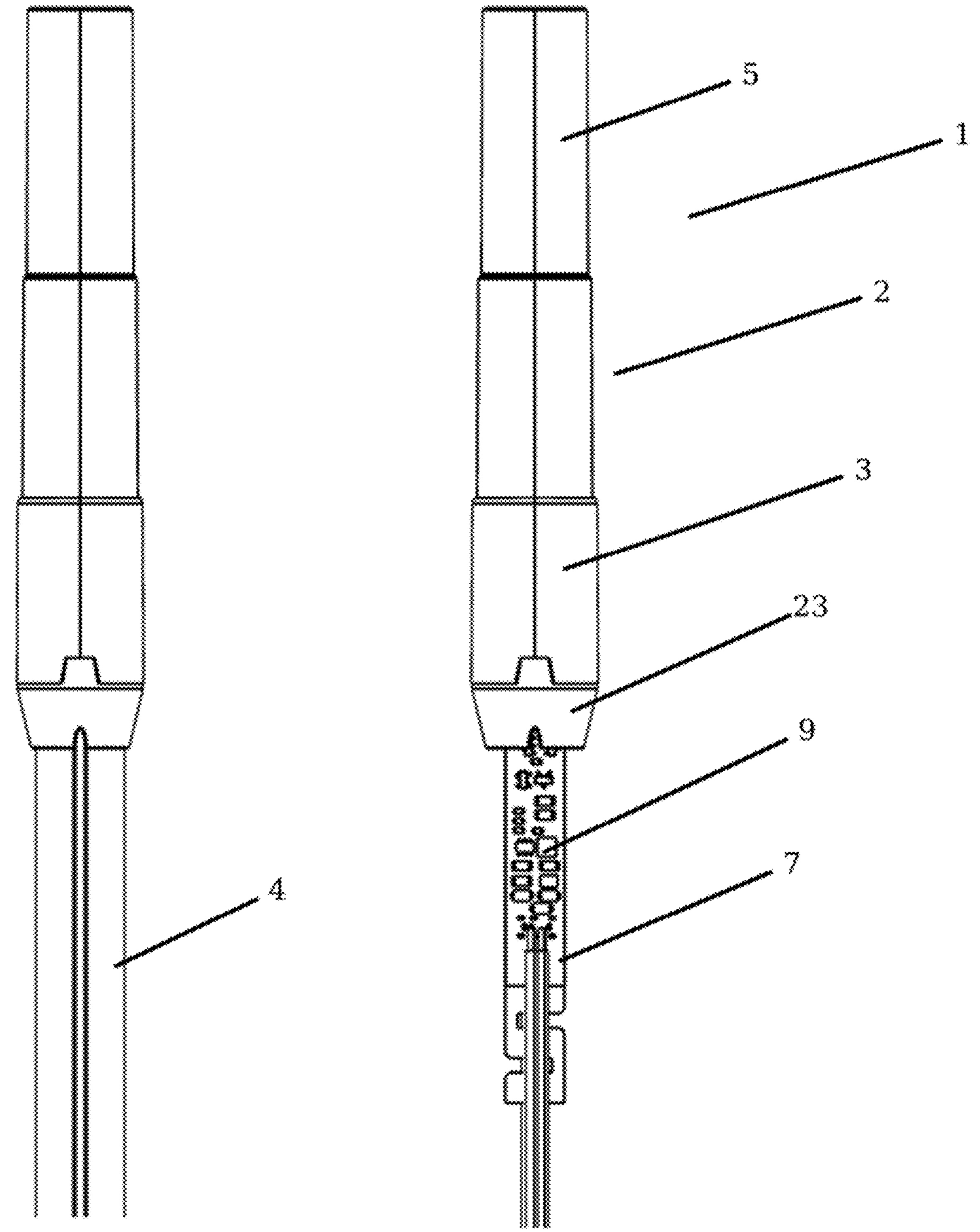
FIG. 22 shows a front view of the exemplary LED navigation light, both in fully assembled and partially assembled states.

FIG. 22 shows another view of the exemplary LED navigation light assembly, showing the use of a spacer 23 with the cover 3 and the pole 4. Spacer 23 is utilized within the assembly to aid in the precise placement of components, ensuring consistent performance and stability of the light fixture.

FIG. 22 presents a view of the exemplary LED navigation light system, illustrating the interplay between its protective cover 3, window 5, flexible circuit 7, spacer 23, and LED drivers 9 along the supporting pole 4, for maintaining the light's performance and integrity in a marine environment.

Figure 23:
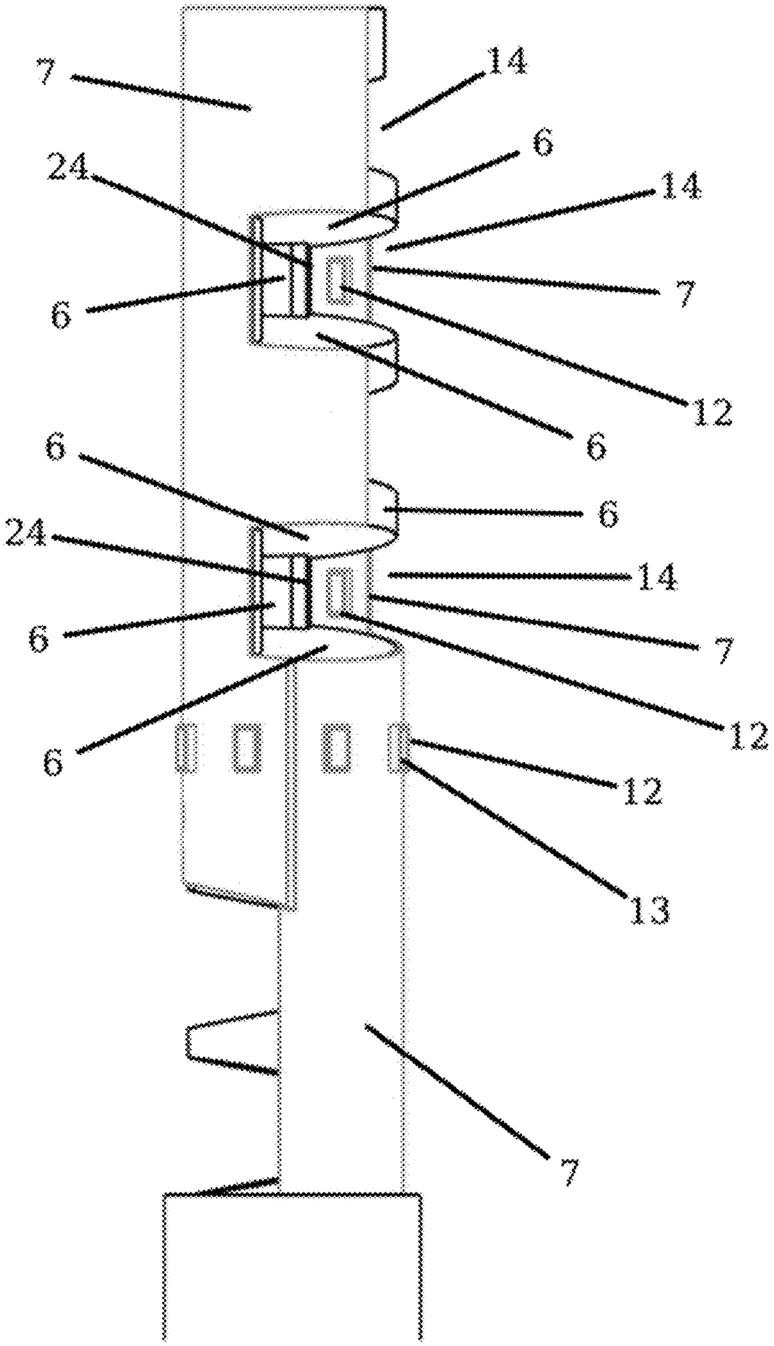
FIG. 23 is a side view of the exemplary LED navigation light showing the upper 225-degree LEDs positioned on the flexible circuit in the upper core openings.
Figure 24:
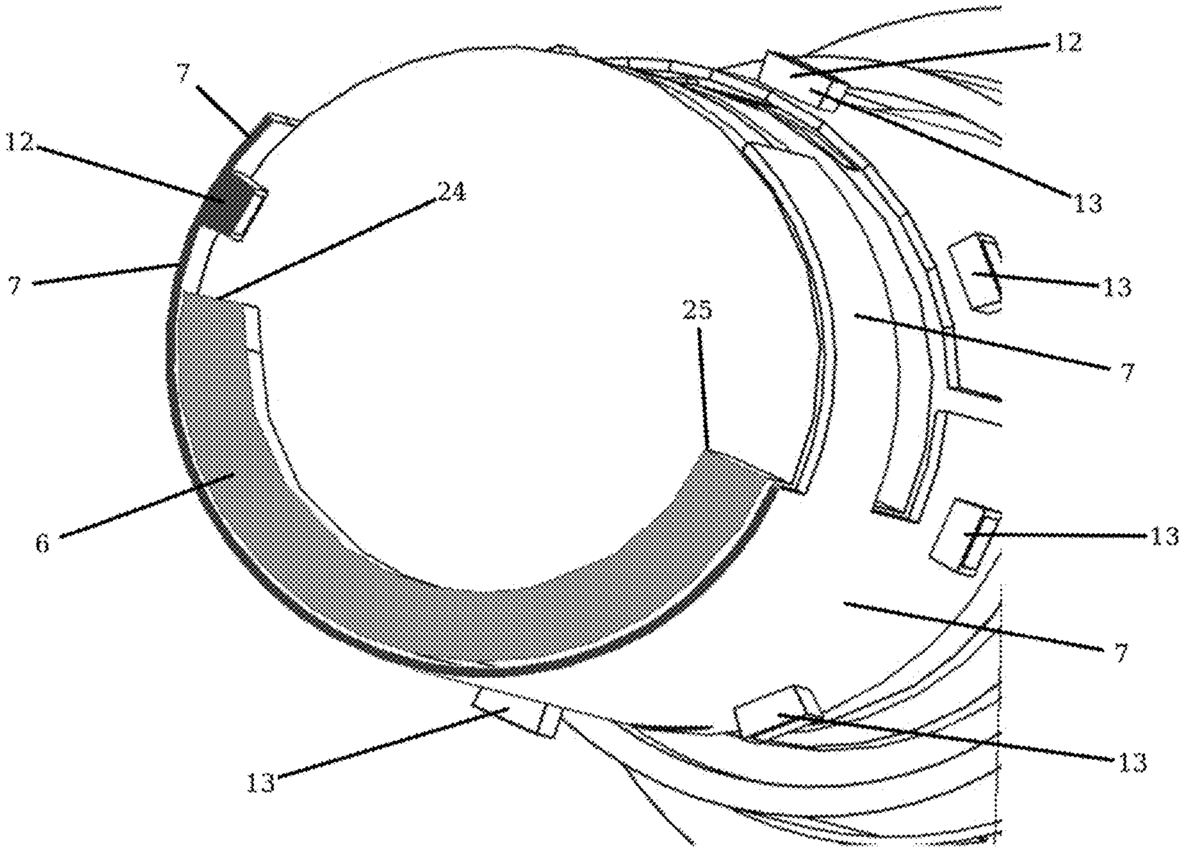
FIG. 24 is a sectional perspective view of the exemplary LED navigation light (second upper core opening down) showing an upper 225-degree LED positioned on the flexible circuit in an upper core opening.

FIG. 23 is a side elevational view annotated to show that an edge of the flexible circuit 7 extends past an edge 24 of the core 6 and the upper 225-degree LEDs 12 are mounted to the flexible circuit 7 at that portion of the flexible circuit 7. Some of the light from the upper 225-degree LEDs 12 directly creates the 225-degree masthead light pattern and some of the light from the upper 225-degree LEDs 12 indirectly creates the 225-degree masthead pattern by reflecting off of the inside of the core 6 at the upper core opening 14. FIG. 24 further illustrates this. As can be seen, the other edge 25 of the core 6 at the upper core opening 14 masks the light from the 225-degree LEDs 12, providing a sharp cutoff for the 225-degree light pattern. In this exemplary embodiment, the inside walls of the core 6 forming the upper core openings 14 are not coated with anything. In some exemplary embodiments, the core 6 is molded from black plastic that provides a gloss black surface at the inside walls of the core 6 forming the upper core openings 14. In other exemplary embodiments, the inside walls of the core 6 forming the upper core openings 14 are molded from black plastic and provided with a light absorbing mico-texture to reduce the light from the core.

Figure 25:
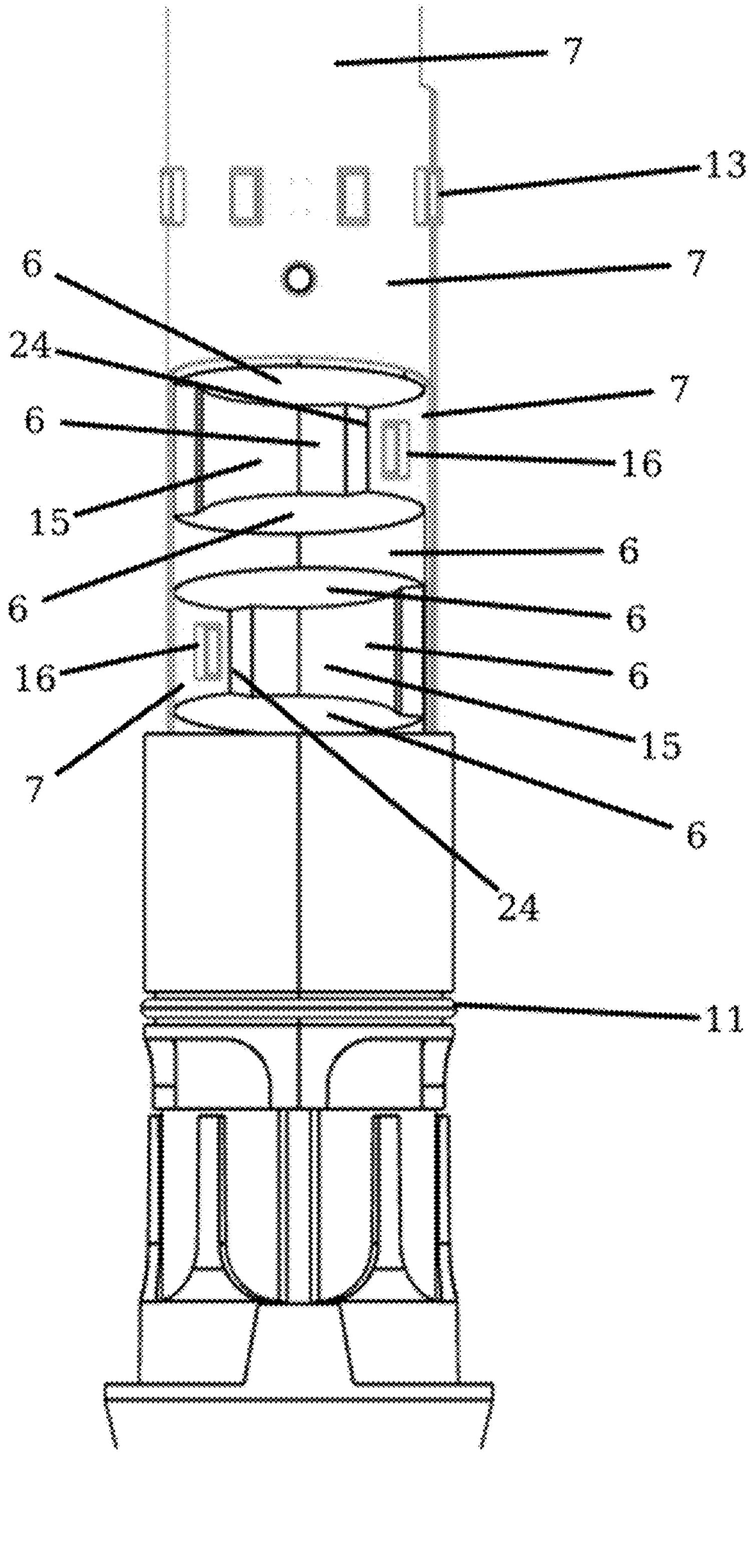
FIG. 25 is rear view of the exemplary LED navigation light showing the 135-degree LEDs positioned on the flexible circuit in the lower core openings.
Figure 26:
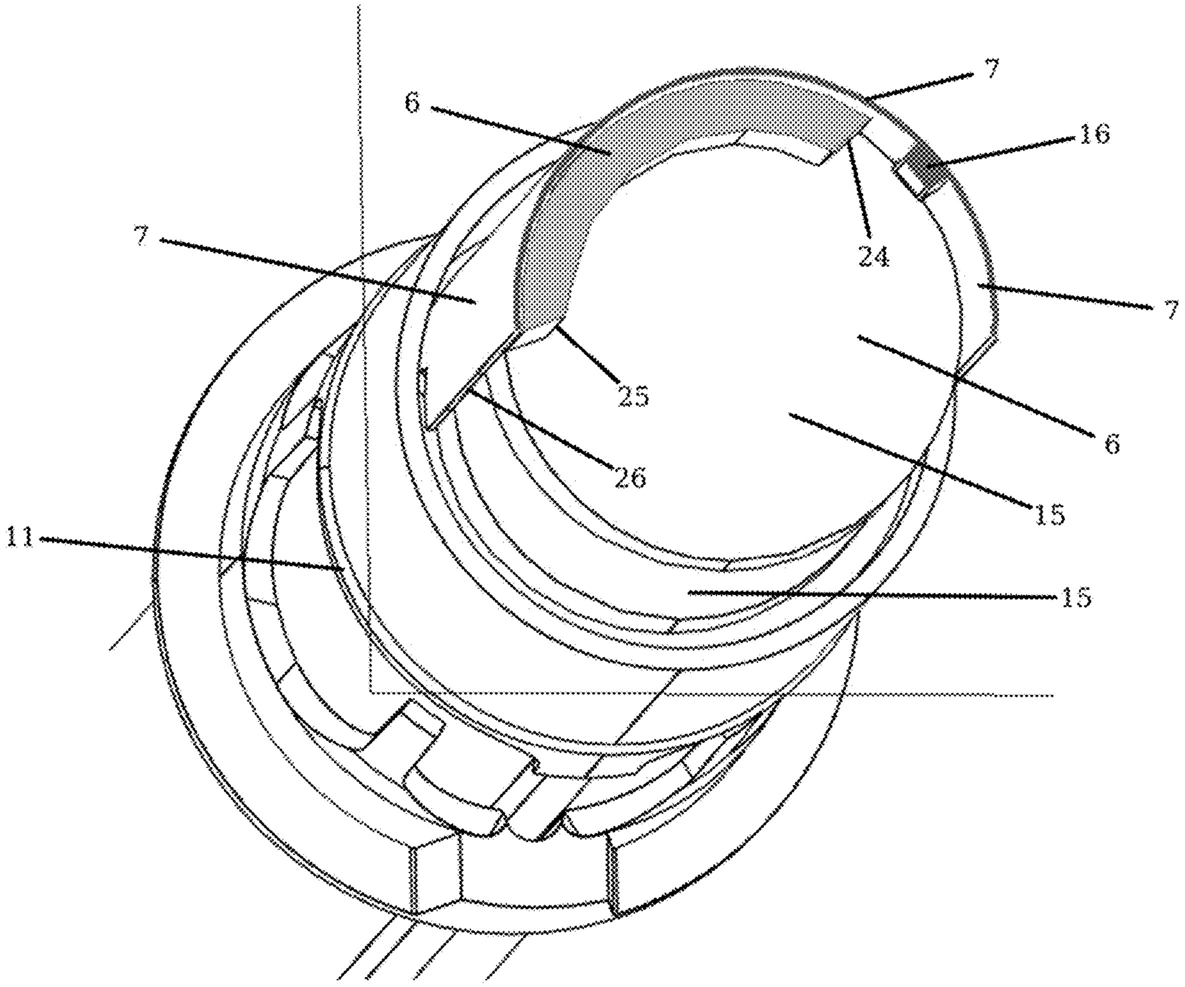
FIG. 26 is a sectional perspective view of the exemplary LED navigation light (top lower core opening) showing a 135-degree LED positioned on the flexible circuit in a lower core opening.

FIG. 25 shows a side elevational view annotated to show that an edge of the flexible circuit 7 extends past an edge 24 of the core 6 and the 135-degree LEDs 16 are mounted to the flexible circuit 7 at that portion of the flexible circuit 7. Some of the light from the 135-degree LEDs 16 directly creates the 135-degree stern light pattern and some of the light from the 135-degree LEDs 16 indirectly creates the 135-degree stern light pattern by reflecting off of the inside of the core 6 at the lower core opening 15. FIG. 26 further illustrates this. As can be seen, the other edge 25 of the core 6 at the lower core opening 15 masks the light from the 135-degree LEDs 16 providing a sharp cutoff for the 135-degree light pattern. In this exemplary embodiment, the inside walls of the core 6 forming the lower core openings 15 are not coated with anything. In some exemplary embodiments, the core 6 is molded from black plastic that provides a gloss black surface at the inside walls of the core 6 forming the lower core openings 15. In other exemplary embodiments, the inside walls of the core 6 forming the lower core openings 15 are molded from black plastic and provided with a light absorbing mico-texture to reduce the light from the core.

In the illustrations, the core 6 features core indentations 20, which are distinct recesses in the core 6. Most of the indentations 20 shown are for reducing material for the injection molding process, which reduces weight of the core. Other indentations 20A that aid in the proper placement, alignment, and stabilization of the wrapped flexible circuit 7. These indentations 20A ensure the flexible circuit 7 remains in place to maintain optimal contact for thermal and electrical conductivity. The cylindrical shape of the core 6 combined with the core indentations 20A facilitates precise alignment and positioning of the LEDs to create the optical patterns when the flexible circuit 7 is wrapped around the core 6.

From the views, it is also evident that the core 6 (a downward extension of the core 6) has a planar portion 21. This planar portion 21 is designed to provide a surface for the part of the flexible circuit 7 that carries the LED drivers 9.

Moreover, a serpentine region 22 is shown at one end of the downward extension of the core 6. In certain exemplary embodiments, the wiring 19 is wound around the serpentine region 22 of the core 6 to provide strain relief, e.g., to hold the wires 19 in place so tugging on the wires 19 does not stress the solder pads on the flexible circuit 7 where the wires 19 are attached. This serpentine region 22 consists of a series of closely spaced slots or channels designed to create a winding path for the wiring.

During assembly, the wiring 19, which connects various electrical components such as the LEDs, LED drivers 9, and other circuitry on the flexible circuit 7, is guided around these channels in the serpentine region 22. By winding the wiring around this serpentine pathway, any tension or stress applied to the wiring—whether from movement during assembly or installation or from environmental factors once installed—is distributed along the length of the wire below the LED light 2 rather than pulling the wiring 19 away from the solder pads on flexible circuit 7. This reduces the risk of damage to the wires and circuitry and maintains the integrity of the electrical connections.

The serpentine winding effectively absorbs and disperses strain, and locks the wiring 19 in place, preventing the wiring 19 from being pulled taught and potentially breaking or loosening from their connection points on the flexible circuit 7. The serpentine region thus enhances the durability and reliability of the navigation light's electrical system, ensuring that it remains functional and safe during assembly, installation and under various conditions typically encountered in marine environments.

The views in FIG. 21 collectively demonstrates how these elements—the upper core openings 14, lower core openings 15, core indentations 20, planar portion 21, and serpentine region 22—integrate within the core 6 to support the flexible circuit 7, maintain structural stability, and optimize the thermal and electrical performance of the navigation light. These components work together to facilitate the even distribution of light and effective thermal management, important for meeting marine navigation light standards.

The hole in the core 6 and flexible circuit 7 seen at the top of FIGS. 6, 7, 10, 11, 13, 15, and 18 is for an alignment pin during assembly. During assembly, a fixture having two pins is used and the flexible circuit 7 is lowered on the pins and then the plastic core 6 is lowered over that and adhered to the flexible circuit 7. Alignment is important considering the angles involved and the regulations involved. In some exemplary embodiments, electrical components (e.g., three larger capacitors) are positioned on the inside of the flexible circuit 7 that drop into core indentations 20A in the core 6 to help with alignment as well.

The navigation light 1 is assembled as follows: (a) the core 6 is provided, (b) the flexible circuit 7 is provided with LEDs, LED drivers 9, wiring 19, and other components (e.g., a processor such as a microcontroller, communications circuitry, etc.) already installed to pads on the flexible circuit 7, (c) the flexible circuit 7 is optionally pre-bent into a shape as though it is wrapped around a cylindrical core 6, (d) the flexible circuit 7 is precisely aligned (one or more pins) with the core 6, wrapped around the core 6, and affixed to the core 6 with adhesive, (e) the O-ring 11 is added around the core 6, (f) the cover 3 with its window 5 is fitted to the core using the notch at the top of the core as a guide, (g) the spacer 23 is inserted with the planar part of the flexible circuit 7 through an opening and secured with potting material, and (h) the wiring 19 is threaded through the pole 4, and (i) the pole 4 is secured to the spacer 23 with the potting material, which secures the parts together and seals them for the harsh marine environment. More specifically, the flex circuit 7 can be but does not necessarily have to be pre-bent. In an exemplary manufacturing process, the Flex circuit 7 with adhesive exposed is laid flat on a fixture with two pins through the holes in the flex. The core is then lowered over the pins so that the board is precisely aligned, and the flex circuit 7 is finish wrapped in a fixture or by hand. In exemplary embodiments, the pole 4 is carried by a base and secured to a boat or ship by the base, e.g., a fixed base, a manually moveable base with a pivoting connection to the pole 4, or a motorized base that moves the pole 4 up and down via a controlled motor. Accordingly, the proximal end of the pole 4 is secured to whatever base is being used.

The O-ring 11 is used to seal and hold back potting material used during the assembly process. The potting material is what provides the watertight seal and adheres the pole 4 to the cover 3.

In exemplary embodiments, the core 6 is injection molded thermoplastic, e.g., injection molded acrylonitrile butadiene styrene (ABS). Other thermally conductive plastics or metals (e.g., cast metal) could be used. In exemplary embodiments, the window 5 is injection molded thermoplastic, e.g., injection molded polycarbonate. In some exemplary embodiments, the window 5 is used as molded (and polished, if needed). In other exemplary embodiments, the inside wall(s) of the window 5 are coated with an anti-reflective coating to reduce scattering of the light.

In exemplary embodiments, the flexible circuit 7 is a flexible printed circuit board (flex PCB). Any suitable material for a flexible circuit 7 for LED lighting applications will suffice (taking into account its ability to flex, heat dissipation, etc.), as long as the flexible circuit 7 is flexible enough to go around the core and be affixed to the core, e.g., with adhesive. In exemplary embodiments, the flexible circuit 7 is made of, e.g., polyamide and copper. In exemplary embodiments, the adhesive used to secure flexible circuit 7 to the core 6 double-sided acrylic tape, e.g., VHB tape.

In some exemplary embodiments, there are no lenses in the design. In other exemplary embodiments (not shown), the outer optic includes lenses and/or the core has lenses.

In some exemplary embodiments, the LEDs 2, 12, 13, 16 are LUMILEDS brand 3014 series mid-power LEDs driven by generic LED drivers. In some exemplary embodiments, the flexible circuit carries at least the LEDs and traces to/from the LED drivers. In other exemplary embodiments, the flexible circuit carries at least the LEDs, the LED drivers, traces from the LED drivers to/from the LEDs, and traces from a power source.

Figure 27:
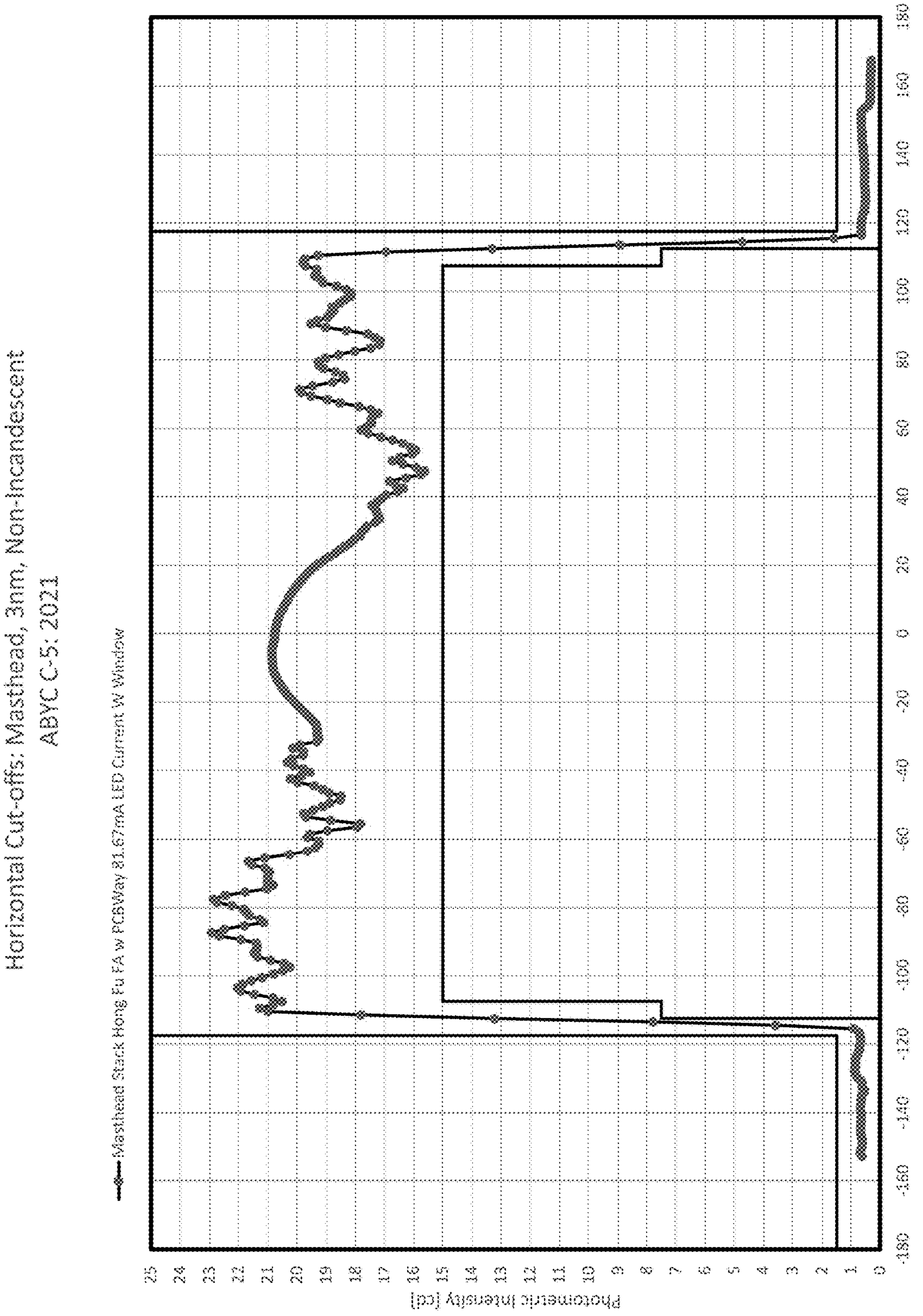
FIG. 27 is a plot of the intensity of the light in candela across the horizontal for the exemplary 225-degree masthead light.

FIG. 27 is a plot of the intensity of the light in candela across the horizontal for the exemplary 225-degree masthead light formed and shaped by the 225-degree LEDs 12 and the exemplary the core 6 and the flexible circuit 7 shown herein in FIGS. 1-22. Notice it has an intensity over 15 candela and has the appropriate cutoffs.

In the exemplary embodiment of FIGS. 1-22, the head unit (core, flex circuit, and outer optic) weighs under 1.25 oz. (e.g., 1-1.25 oz. such as 30-35 grams) and the core outer diameter (OD) is roughly 0.545" (e.g., 0.45-0.6" or 0.50-0.6"). In this exemplary embodiment, the OD of the outer optic (window), i.e., the OD of the head, is 0.76" (e.g., between 0.7-0.8"). In this exemplary embodiment, the cover (forming the head) is 127 mm high or about five inches. In some exemplary embodiments, the inner diameter (ID) of the window is designed to be the OD of the core plus the thickness of the flex board. In this exemplary embodiment, the flex board is roughly 0.006-0.012" thick or 0.15-0.3 mm. In this exemplary embodiment, the head has a mass of 35 grams with a 13.8 mm core OD and a 19.25 mm OD of the window. In some exemplary embodiments, this small, narrow package provides a combination of a 360-degree (all-around) light, a 225-degree masthead light, and a 135-degree stern light with a minimum of 3 nautical miles intensity.

In the exemplary embodiment of the '155 Appl'n, the head unit (core, flex circuit, and outer optic) weighs under 1.25 oz. (e.g., 1-1.25 oz.) and the core outer diameter (OD) is roughly 0.5" (e.g., 0.45-0.55" or 0.50-0.55"). In some exemplary embodiments, the OD of the outer optic (window), i.e., the OD of the head, is between 0.60-0.65". In some exemplary embodiments, the inner diameter (ID) of the window is designed to be the OD of the core plus the thickness of the flex board. In some exemplary embodiments, the flex board is roughly 0.006-0.012" thick or 0.15-0.3 mm. In some exemplary embodiments, the head has a mass of 35 grams with a 13 mm core OD and a 16 mm OD of the window. In some exemplary embodiments, this small, narrow package provides a combination of a 360-degree (all-around) light and a 225-degree masthead light with an intensity of 3 nautical miles.

In the exemplary embodiments shown, the circuit is shown and described as a flexible circuit 7 wrapped around the outside of the core 6. In an alternative embodiment, design believed to be possible and within the scope of this disclosure is the flexible circuit 7 being an internal flexible circuit 7 in which portions with LEDs are pressed into wells in a core 6 with openings similar to the upper core openings 14 and lower core openings 15. The 225-degree LEDs 12 and/or the 135-degree LEDs 16 (depending on which light pattern(s) is/are desired) would need to still face inward toward the inside of the core and the light would have to get shut off by the opposite side of the core 7 or flexible circuit 7. One skilled in the art can make such a navigation light with an internal flexible circuit 7 using the teachings herein.

In the exemplary embodiments shown, the circuit is shown and described as a flexible circuit 7 wrapped around the core 6. In yet another alternative embodiment, a coreless design is believed to be possible and within the scope of this disclosure, with the flexible circuit 7 being instead more rigid and self-supporting, e.g., made of a rolled circuit board (maybe aluminum core) inside the window 5. Picture the flexible circuit 7 of FIGS. 12-14 being more rigid and not needing a core for support. In this sense it would be curved circuit board rather than a flexible one. The tolerances of the upper flex circuit openings 17 and lower flex circuit openings 18 would likely need to be adjusted to hit the applicable specifications for the 225-degree masthead light, the 360-degree all-around light, and the 135-degree stern light. One skilled in the art can make a coreless navigation light using the teachings herein.

Although the embodiments have been illustrated in the accompanying drawings and described in the foregoing detailed description, it is to be understood that the described system is not limited to just the disclosed embodiments, but is capable of numerous rearrangements, modifications, and substitutions without departing from the scope of the claims. The claims as follow are intended to encompass all modifications and alterations insofar as they fall within the scope of the claims and their equivalents. Additional advantages and modifications will readily appear to those skilled in the art. Therefore, the inventive concept, in its broader aspects, is not limited to the specific details, the representative apparatus, and illustrative examples shown and described. Accordingly, departures may be made from such details without departing from the spirit or scope of the applicant's general inventive concept. For example, the term "LED" as used herein is used broadly and intended to cover other small, bright light sources that are not necessarily "light emitting diodes" per se, although the term "LED per se" may be later used in the claims in the alternative wherever the term LED is used to specify "light emitting diodes" per se.

The invention claimed is:

1. An LED navigation light, comprising a flexible electrical circuit carrying LEDs, the flexible electrical circuit wrapped around an outside of a core with at least one of the LEDs facing inward toward the inside of the core, and with light output from the inward facing LEDs being shaped by at least walls of openings in the core.

2. The LED navigation light system of claim 1, wherein light from a first plurality of LEDs carried by the flexible electrical circuit is summed to form a first light pattern of the navigation light and light from a second plurality of LEDs carried by the flexible electrical circuit is summed to form a second light pattern of the navigation light, and wherein a first subset of the first plurality of LEDs is inward facing.

3. The LED navigation light system of claim 2, wherein the first light pattern of the navigation light comprises a masthead light pattern and the second light pattern of the navigation light comprises a 360-degree light pattern.

4. The LED navigation light system of claim 2, wherein the first light pattern of the navigation light comprises a masthead light pattern having a full emission angle of 225 degrees and the second light pattern of the navigation light comprises a 360-degree light pattern.

5. The LED navigation light system of claim 2, wherein the first light pattern of the navigation light comprises a masthead light pattern having a full emission angle of 225 degrees and the second light pattern of the navigation light comprises a 360-degree light pattern with a minimum of 3 nautical miles intensity.

6. The LED navigation light system of claim 2, wherein the LEDs of the first subset of the first plurality of LEDs are on one, inward side of the flexible electrical circuit and are inward facing toward the core and the LEDs of a second subset of the first plurality of LEDs are on the other, outward side of the flexible electrical circuit and are outward facing away from the core.

7. The LED navigation light system of claim 2, wherein the LEDs of the first subset of the first plurality of LEDs are on one, inward side of the flexible electrical circuit and are inward facing toward the core, the LEDs of a second subset of the first plurality of LEDs are on the other, outward side of the flexible electrical circuit and are outward facing away from the core, and a majority of the LEDs of the second plurality of LEDs are on the outward side of the flexible electrical circuit and are outward facing away from the core.

8. The LED navigation light system of claim 7, wherein the first light pattern of the navigation light comprises a masthead light pattern having a full emission angle of 225 degrees with a minimum of 3 nautical miles intensity.

9. The LED navigation light system of claim 8, wherein the first light pattern of the navigation light comprises a masthead light pattern having a full emission angle of 225 degrees and the second light pattern of the navigation light comprises a 360-degree light pattern with a minimum of 3 nautical miles intensity (while maintaining the required cutoff angles).

10. The LED navigation light system of claim 8, further comprising a third plurality of LEDs carried by the flexible electrical circuit on the one, inward side of the flexible electrical circuit and inward facing toward the core forming a third light pattern of the navigation light comprising a stern light pattern having a full emission angle of 135 degrees.

11. The LED navigation light system of claim 2, wherein the flexible electrical circuit comprises a flexible printed circuit board.

12. The LED navigation light system of claim 2, wherein at least one light sensor is integrated into the assembly to measure a component of at least one of the LEDs intensity to determine if the intensity meets a predefined level, a signal from the at least one sensor being used by circuitry to at least one of automatically adjust an intensity of the LEDs and trigger an alert if the intensity is at or below a threshold.

13. The LED navigation light system of claim 1, wherein the core is substantially cylindrical.

14. The LED navigation light system of claim 1, wherein navigation light is carried by a pole that is carried by one of: a fixed base, a manually moveable base with a pivoting connection to the pole, or a motorized base that moves the pole up and down via a controlled motor.

15. An LED navigation light that uses a flexible electrical circuit to distribute power to multiple LEDs where the summation of the light output from the LEDs creates the required light pattern by bending the flexible circuit such that the LEDs are generally facing toward the center of curvature.

16. The LED navigation light system of claim 15, wherein various components of the light pattern are separated by some distance in the axial direction of the light pattern.

17. The LED navigation light system of claim 15, wherein at least one light sensor is integrated into the assembly to measure a component of at least one of the LEDs intensity to determine if the intensity meets a predefined level.

* * * * *